United States Patent
Jin

(10) Patent No.: US 7,332,736 B2
(45) Date of Patent: Feb. 19, 2008

(54) ARTICLE COMPRISING GATED FIELD EMISSION STRUCTURES WITH CENTRALIZED NANOWIRES AND METHOD FOR MAKING THE SAME

(75) Inventor: Sungho Jin, San Diego, CA (US)

(73) Assignee: Samsung Electronic Co., Ltd, Gyeonggi-do (KR)

( * ) Notice: Subject to any disclaimer, the term of this patent is extended or adjusted under 35 U.S.C. 154(b) by 244 days.

(21) Appl. No.: 11/014,534

(22) Filed: Dec. 16, 2004

(65) Prior Publication Data

US 2006/0054879 A1   Mar. 16, 2006

Related U.S. Application Data

(60) Division of application No. 10/643,183, filed on Aug. 18, 2003, now Pat. No. 6,864,162, and a continuation-in-part of application No. 10/357,159, filed on Feb. 3, 2003, now Pat. No. 7,233,101, and a continuation-in-part of application No. 10/357,004, filed on Feb. 3, 2003, now Pat. No. 6,858,521, and a continuation-in-part of application No. 10/350,642, filed on Jan. 24, 2003, now Pat. No. 7,012,266, and a continuation-in-part of application No. 10/350,614, filed on Jan. 24, 2003, now Pat. No. 6,809,465.

(60) Provisional application No. 60/441,437, filed on Jan. 23, 2003, provisional application No. 60/405,561, filed on Aug. 23, 2002.

(51) Int. Cl.
*H01L 29/06* (2006.01)

(52) U.S. Cl. ............... 257/10; 257/14; 257/296; 257/E21.705; 257/E23.074; 257/E23.172; 257/E25.013; 438/48; 438/22; 313/310

(58) Field of Classification Search ............ None
See application file for complete search history.

(56) References Cited

U.S. PATENT DOCUMENTS

| | | | |
|---|---|---|---|
| 4,149,076 A | 4/1979 | Albert | 378/98.6 |
| 5,079,112 A | 1/1992 | Berger et al. | 430/4 |
| 5,399,860 A | 3/1995 | Miyoshi et al. | 250/310 |
| 5,532,496 A | 7/1996 | Gaston | 250/492.22 |
| 5,629,790 A | 5/1997 | Neukermans et al. | 359/198 |
| 5,637,539 A | 6/1997 | Hofmann et al. | 438/20 |
| 5,701,014 A | 12/1997 | Berger et al. | 250/492.22 |
| 5,811,916 A | 9/1998 | Jin et al. | 313/311 |

(Continued)

FOREIGN PATENT DOCUMENTS

EP        1184888        3/2002

OTHER PUBLICATIONS

Zhu et. al., "Large Current Density from Carbon Nanotube Field Emitters," Applied Physics Letters, vol. 75, No. 6, pp. 873-875 (1999).

(Continued)

*Primary Examiner*—Sue A. Purvis
*Assistant Examiner*—Fazli Erdem
(74) *Attorney, Agent, or Firm*—Harness, Dickey & Pierce, PLC

(57) ABSTRACT

This invention provides novel methods of fabricating novel gated field emission structures that include aligned nanowire electron emitters (individually or in small groups) localized in central regions within gate apertures. It also provides novel devices using nanoscale emitters for microwave amplifiers, electron-beam lithography, field emission displays and x-ray sources. The new emission structures are particularly useful in the new devices.

14 Claims, 19 Drawing Sheets

U.S. PATENT DOCUMENTS

| | | | |
|---|---|---|---|
| 5,904,561 A | 5/1999 | Tseng | 438/643 |
| 5,982,095 A | 11/1999 | Jin et al. | 313/582 |
| 6,028,689 A | 2/2000 | Michalicek et al. | 359/224 |
| 6,062,931 A | 5/2000 | Chuang et al. | 445/24 |
| 6,069,599 A | 5/2000 | Py et al. | 345/74.1 |
| 6,103,305 A | 8/2000 | Friedmann et al. | 427/249.7 |
| 6,124,650 A | 9/2000 | Bishop et al. | 310/40 |
| 6,141,470 A | 10/2000 | Espindola et al. | 385/37 |
| 6,187,604 B1 | 2/2001 | Gilton | 438/20 |
| 6,201,631 B1 | 3/2001 | Greywall | 359/245 |
| 6,283,812 B1 | 9/2001 | Jin et al. | 445/24 |
| 6,297,063 B1 | 10/2001 | Brown et al. | 438/2 |
| 6,297,592 B1 | 10/2001 | Goren et al. | 315/3.5 |
| 6,333,968 B1 | 12/2001 | Whitlock et al. | 378/136 |
| 6,391,670 B1 | 5/2002 | Wells et al. | 438/20 |
| 6,401,526 B1 | 6/2002 | Dai et al. | 73/105 |
| 6,411,020 B1 | 6/2002 | Yaniv et al. | 313/310 |
| 6,465,132 B1 | 10/2002 | Jin | 429/231.8 |
| 6,472,802 B1 * | 10/2002 | Choi et al. | 313/309 |
| 6,489,349 B1 | 12/2002 | Thomas et al. | 250/423 F |
| 6,512,235 B1 | 1/2003 | Eitan et al. | 250/423 F |
| 6,519,075 B2 | 2/2003 | Carr et al. | 359/291 |
| 6,525,461 B1 | 2/2003 | Iwasaki et al. | 313/495 |
| 6,538,367 B1 | 3/2003 | Choi et al. | 313/309 |
| 6,545,425 B2 | 4/2003 | Victor | 315/169.3 |
| 6,566,704 B2 | 5/2003 | Choi et al. | 257/314 |
| 6,574,026 B2 | 6/2003 | Jin et al. | 359/224 |
| 6,620,640 B2 | 9/2003 | Gilton | 438/20 |
| 6,653,228 B2 | 11/2003 | Choi et al. | 438/637 |
| 6,660,959 B2 | 12/2003 | Vallance et al. | 219/121.18 |
| 6,664,727 B2 | 12/2003 | Nakamoto | 313/495 |
| 6,673,392 B2 | 1/2004 | Lee et al. | 427/249.1 |
| 6,692,568 B2 | 2/2004 | Cuomo et al. | 117/84 |
| 6,741,019 B1 | 5/2004 | Filas et al. | 313/355 |
| 7,091,120 B2 * | 8/2006 | Buretea et al. | 438/602 |
| 2002/0137242 A1 | 9/2002 | Gilton | 438/20 |
| 2002/0146853 A1 | 10/2002 | Karpov et al. | 438/20 |
| 2002/0158342 A1 | 10/2002 | Tuominen et al. | 257/784 |
| 2003/0034244 A1 | 2/2003 | Yasar et al. | 204/192.3 |
| 2003/0071246 A1 | 4/2003 | Grigorov et al. | 252/500 |
| 2003/0096104 A1 | 5/2003 | Tobita et al. | 428/332 |
| 2003/0230753 A1 | 12/2003 | Stecki et al. | 257/89 |

OTHER PUBLICATIONS

Betzig, E. et al., "Near-Field Optics: Microscopy, Spectroscopy, and Surface Modification Beyond the Diffraction Limit", Science, vol. 257, pp. 189-195 (Jul. 10, 1992).

Liu, J. et al., "Fullerene Pipes," Science, vol. 280 pp. 1253-1256 (May 22, 1998).

Li, W.Z. et al., "Large-Scale Synthesis of Aligned Carbon Nanotubes," Science, vol. 274, pp. 1701-1703 (Dec. 6, 1996).

Tans, Sander J. et al., "Individual single-wall carbon nanotubes as quantum wires," Nature, vol. 386, pp. 474-477 (Apr. 3, 1997).

Fan, S. et al., "Self-Oriented Regular Arrays of Carbon Nanotubes and Their Field Emission Properties," Science, vol. 283, pp. 512-514 (Jan. 22, 1999).

Bower, C. et al., "Plasma-induced alignment of carbon nanotubes," Applied Physics Letters, vol. 77, No. 6, pp. 830-832 (Aug. 7, 2000).

Bower, C. et al., "Nucleation and growth of carbon nanotubes by microwave plasma chemical vapor deposition," Applied Physics Letters, vol. 77, No. 17, pp. 2767-2769 (Oct. 23, 2000).

Cheng et al., "Bulk morphology and diameter distribution of single-walled carbon nanotubes: synthesized by catalytic decomposition of hydrocarbons", Chem. Physics Letters, vol. 289, p. 602-610 (1998).

Andrews et al., Chem. Physics Letters, "Continuous production of aligned carbon nanotubes: a step closer to commercial realization", vol. 303, pp. 467-474 (1999).

Jessensky, O. et al., "Self-organized formation of hexagonal pore arrays in anodic alumina", Journal of Applied Physics, vol. 72, pp. 1173 (1998).

Li, A.P. et al., Journal of Applied Physics, vol. 84, No. 11 pp. 6023-6026 (1998).

Scott, A.W., Understanding Microwaves, Ch. 12, pp. 282-317 (1993).

Gilmour, Jr., A.S., Microwave Tubes, Chapter 8, "Gridded Tubes", Artech House, pp. 191-313 (1986).

Spindt, C.A. et al., "Field-Emitter-Array Developement For High Frequency Operation," J. Vac. Sci., Technol. B, vol. 11, pp. 468-473 (1993).

Kong, Y.C. et al., "Ultraviolet-emitting ZnO nanowires synthesized by a physical vapor deposition approach", Applied Physics Letters, vol. 78, No. 4, pp. 407-409 (2001).

Tsai, C.L. et al., "Bias effect on the growth of carbon nanotips using microwave plasma chemical vapor deposition", Applied Physics Letters, vol. 81, No. 4, pp. 721-723 (2002).

Li, Chao et al., "$In_2O_3$ nanowires as chemical sensors", Applied Physics Letters, vol. 82, No. 10, pp. 1613-1615 (2003).

Rouse, Ambrosio A. et al., "Field emission from molybdenum carbide", Applied Physics Letters, vol. 76, No. 18, pp. 2583-2585 (2000).

Brodie, I. et al., "Vacuum Microelectronics", Advances in Electronics and Electron Physics, vol. 83, pp. 1-106 (1992).

Rinzler, A.G. et al., "Unraveling Nanotubes: Field Emission from an Atomic Wire", Science, vol. 269, pp. 1550-1553 (1995).

Bower, C. et al., "On-chip vacuum microtriode using carbon nanotube field emitters", Applied Physics Letters, vol. 80, No. 20, pp. 3820-3822 (2002).

de Heer, Walt et al., "A Carbon Nanotube Field-Emmission Electron Source", Science, vol. 270, pp. 1179-1180 (1995).

Saito, Yahachi et al., "Field Emission Patterns from Single-Walled Carbon Nanotubes", Jpn., J. Appl. Phys., vol. 36, pp. L1340-L1342, Part 2, No. 10A (1997).

Wang, Q.H. et al., "Field Emission From Nanotube Bundle Emitters at Low Fields", Appl. Phys. Lett. 70 (24), pp. 3308-3310 (1997).

Adachi, H. et al., "Stable carbide field emitter", Appl. Phys. Lett. 43 (7), pp. 702-703 (1983).

Huang, Michael H. et al., "Room-Temperature Ultraviolet Nanowire Nanolasers", Science, vol. 292, pp. 1897-1899 (2001).

Aggarwal, S. et al., "Spontaneous Ordering of Oxide Nanostructures", Science, vol. 287, pp. 2235-2237 (2000).

Luo, Yun et al., "Nanoshell tubes of ferroelectric lead zirconate titanate and barium titanate", Applied Physics Letters, vol. 83, No. 3, pp. 440-442 (2003).

Merkulov, Vladimir I. et al., "Shaping carbon nanostructures by controlling the synthesis process", Applied Physics Letters, vol. 79, No. 8, pp. 1178-1180 (2001).

Teo, KBK et al., "Plasma enhanced chemical vapour deposition carbon nanotubes/nanofibres—how uniform do they grow?", Institute of Physics Publishing, Nanotechnology 14, pp. 204-211 (2003).

Mackie, W.A. et al., "Emission and Processing Requirements for Carbide Films on MO Field Emitters", Mat. Res. Soc Symp. Proc. vol. 509, pp. 173-178 (1998).

Wang, Q.H. et al., "A nanotube-based field-emission flat panel display", Applied Physics Letters, vol. 72, No. 22, pp. 2912-2913 (1998).

Saito, Yahachi et al., "Cathode Ray Tube Lighting Elements with Carbon Nanotube Field Emitters", Jpn. J. Appl. Phys., vol. 37, pp. L346-L348 (1998).

Bonard, Jean-Marc et al., "Field emission from single-wall carbon nanotube films", Applied Physics Letters, Vol. 73, No. 7, pp. 918-920 (1998).

Dean, Kenneth A. et al., "Field emission microscopy of carbon nanotube caps", Applied Physics Letters, vol. 85, No. 7, pp. 3832-3836 (1999).

Ren, Z.F. et al., "Synthesis of Large Arrays of Well-Aligned Carbon Nanotubes on Glass," Science, vol. 282, pp. 1105-1107 (Nov. 6, 1998).

* cited by examiner

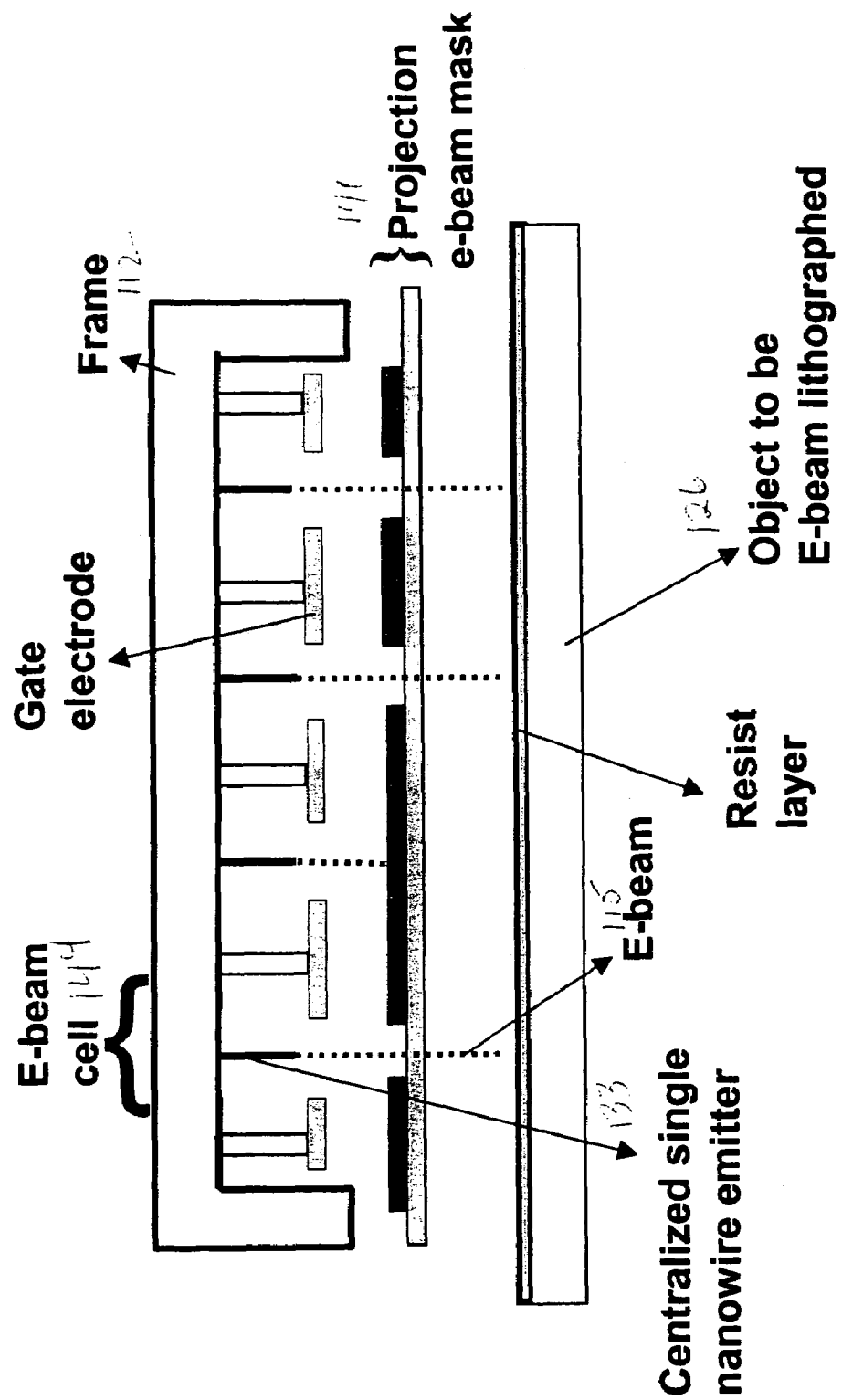
Fig. 14 [Other optical components such as lenses not shown]

ARTICLE COMPRISING GATED FIELD EMISSION STRUCTURES WITH CENTRALIZED NANOWIRES AND METHOD FOR MAKING THE SAME

CROSS REFERENCE TO RELATED APPLICATIONS

This is a divisional of U.S. application Ser. No. 10/643,183 filed by the present inventor on Aug. 18, 2003 now U.S. Pat. No. 6,864,162 and entitled "Article Comprising Gated Field Emission Structures With Centralized Nanowires and Method for Making the Same".

This application claims the benefit of the following United States provisional patent applications and is a continuation-in part of the following United States Utility Patent Applications:

1. U.S. Provisional Application Ser. No. 60/405,561 filed by S. Jin on Aug. 23, 2002 and entitled "MEMs Based Two-Dimensional E-Beam Nanolithography Device and Method For Making the Same";

2. U.S. Provisional Application Ser. No. 60/441,437 filed by S. Jin on Jan. 21, 2003 and entitled "Article Comprising A Gated Field Emission Structure With Centralized Nanowires and Method for Making the Same";

3. U.S. patent application Ser. No. 10/350,614 filed by S. Jin on Jan. 24, 2003 now U.S. Pat. No. 6,809,465 and entitled "Article Comprising MEMs-Based Two Dimensional E-Beam Sources and Method for Making the Same";

4. U.S. patent application Ser. No. 10/350,642 filed by S. Jin on Jan. 24, 2003 now U.S. Pat. No. 7,012,266 and entitled "MEMs-Based Two Dimensional E-Beam Nano Lithography Device and Method for Making the Same";

5. U.S. patent application Ser. No. 10/357,004 filed by S. Jin on Feb. 3, 2003 now U.S. Pat. No. 6,858,521 and entitled "Method for Fabricating Spaced-Apart Nanostructures"; and 6. U.S. patent application Ser. No. 10/357,159 filed by S. Jin on Feb. 3, 2003 now U.S. Pat. No. 7,233,101 and entitled "Articles Comprising Spaced-Apart Nanostructures and Methods for Making the Same."

Each of the above identified provisional and utility patent applications are incorporated herein by reference.

FIELD OF THE INVENTION

This invention relates to electron field emission devices, and in particular, to gated field emission devices containing nanowire emitters.

BACKGROUND OF THE INVENTION

Field emitting devices are useful in a wide variety of applications, such as flat panel displays, microwave power amplifiers, and nano-fabrication tools. See U.S. Pat. No. 6,283,812 to Jin, et al. issued on Sep. 4, 2001 and entitled "Process for fabricating article comprising aligned truncated carbon nanotubes". Also see U.S. Pat. No. 6,297,592 to Goren, et al., issued on Oct. 2, 2001 and entitled "Microwave vacuum tube device employing grid-modulated cold cathode source having nanotube emitters".

A typical field emitting device comprises a field emitting assembly composed of a cathode and one or more field emitter tips. The device also typically includes a grid closely spaced to the emitter tips and an anode spaced further from the cathode. Voltage induces emission of electrons from the tips, through the grid, toward the anode.

Nanowires are potentially useful as electron emitters for field emission devices. Small diameter nanowires, such as carbon nanotubes with a diameter on the order of 1-100 nanometers, have received considerable attention in recent years. See Liu et al., SCIENCE, Vol. 280, p. 1253 (1998); Ren et al., SCIENCE, Vol. 282, p. 1105 (1998); Li et al., SCIENCE, Vol. 274, p. 1701 (1996); J. Tans et al., NATURE, Vol. 36, p. 474 (1997); Fan et al., SCIENCE, Vol. 283, p. 512 (1999); Bower et als., Applied Physics Letters, Vol. 77, p. 830 (2000), and Applied Physics Letters, Vol. 77, p. 2767 (2000). The term "nanowire" is used generically herein to include both solid nanowires and hollow nanowires (nanotubes).

Carbon nanotubes exhibit unique atomic arrangements, nano-scale structures, and unusual physical properties such as one-dimensional electrical behavior, quantum conductance, and ballistic transport characteristics. Carbon nanotubes are among the smallest dimensioned nanowire materials with generally high aspect ratio and small diameter, e.g., single-wall nanotubes may be made with diameters of ~1 nm and multi-wall nanotubes with diameters of less than ~50 nm.

High-quality single-wall carbon nanotubes are typically grown as randomly oriented, needle-like or spaghetti-like, tangled nanowires by laser ablation or arc techniques. Chemical vapor deposition (CVD) methods such as described above by Ren et al., Fan et al., Li et al., and Bower et al. produce multiwall nanowires attached to a substrate, often with a semi-aligned or aligned, parallel growth perpendicular to the substrate. As described in these articles, catalytic decomposition of hydrocarbon-containing precursors such as ethylene, methane, or benzene produces carbon nanotubes when the reaction parameters such as temperature, time, precursor concentration, flow rate, are optimized. Nucleation layers, such as thin coatings of Ni, Co, or Fe, are often intentionally added to the substrate surface to nucleate a multiplicity of isolated nanowires. Carbon nanotubes can also be nucleated and grown on a substrate without using such a metal nucleating layer, e.g., by using a hydrocarbon-containing precursor mixed with a chemical component such as ferrocene, $(C_5H_5)_2Fe$ which contains one or more catalytic metal atoms. During chemical vapor decomposition, the metal atoms serve to nucleate the nanotubes on the substrate surface. See Cheng et al., CHEM. PHYSICS LETTERS, Vol. 289, p. 602 (1998), and Andrews et al., CHEM. PHYSICS LETTERS, Vol. 303, p. 467 (1999).

Carbon nanotubes have been proposed for field emission devices such as flat panel field emission displays, microwave amplifiers and electron beam lithography devices. Conventional field emission cathode materials typically have been made of metal (such as Mo) or semiconductor material (such as Si) with sharp tips of submicron size. However, the control voltage required for emission is relatively high (around 100 V), because of high work functions and insufficiently sharp tips. To significantly enhance local fields and reduce the voltage requirement for emission, it would be advantageous to provide nanoscale cathodes with small diameters and sharp tips.

In field emission devices, unaligned, randomly distributed nanowires are inefficient electron emitters due to the varying distance and hence varying local electric fields between the cathode (comprised of emitting nanowire tips) and the gate or anode. In addition, when unaligned nanowires are used for emitters, an applied electric field between anode and cathode bends the nanowires along the field direction. The degree of bending is dependent on the applied voltage. This bending causes uncontrollable and undesirable changes in the distance between cathode and gate, and hence alters the local field on different nanowires. In some cases, the bending causes outright electrical shorting between the nanowire tips and the gate.

Referring to the drawings, FIGS. 1(a) and 1(b) (which are conventional) schematically illustrate configurations of aligned nanotubes 10 grown on a substrate 11 in a dense "forest-like" configuration (FIG. 1(a)) or in spaced-apart "forests" (FIG. 1(b)). A forest configuration, however, wastes the unique high-aspect-ratio, field-concentrating characteristics of individual nanowires.

Moreover, while the alignment of nanowires is important for many applications, highly oriented nanowires do not alone guarantee efficient field emission. The reason is that the individual nanowires are so closely spaced that they shield each other from effective field concentration at the ends. It is therefore desirable to create the spaced apart configurations of nanowires 10 schematically illustrated in FIGS. 1(c) and 1(d).

While it is desirable to provide a triode structure with nanowire emitters in the configurations of FIG. 1(c) or 1(d), it is difficult to do so. The fabrication of triode structures involves complex fabrication steps to produce a complex three dimensional structure of cathode, dielectric spacer and gate. Such fabrication often involves multilayer processing of silicon structures requiring various steps of patterning, lithography, and etching of silicon, silicon oxide, silicon nitride, and metal. The nanowires, if deposited before the fabrication steps, may not survive.

It is also difficult to add nanowire emitters after the three dimensional triode structure is formed. The insertion of a single nanowire nucleating nano-island (such as a 5-50 nm diameter island of cobalt or nickel) into the cavity below the suspended gate aperture would be difficult. The subsequent growth of nanowires by CVD is also difficult not only because of the high CVD processing temperature (typically higher than ~550° C.) which can cause undesirable chemical diffusion, thermal stress build-up, and structural distortion of the three dimensional structure, but also because adequate CVD gas may not enter into the micro-size cavity in sufficient quantity or rate. In addition, the growth of an isolated nanowire or small group of nanowires along the vertical direction is difficult because of the absence of neighboring nanowires to provide mechanical support. Furthermore, it is difficult to centrally position the nanowire in the cavity underneath the gate aperture. Accordingly there is a need for improved triodes having centrally located nanowire emitters and methods for making such triodes.

SUMMARY OF THE INVENTION

This invention provides novel methods of fabricating novel gated field emission structures that include aligned nanowire electron emitters (individually or in small groups) localized in central regions within gate apertures. It also provides novel devices using nanoscale emitters for microwave amplifiers, electron-beam lithography, field emission displays and x-ray sources. The new emission structures are particularly useful in the new devices.

BRIEF DESCRIPTION OF THE DRAWINGS

The nature, advantages and various additional features of the invention will appear more fully upon consideration of the illustrative embodiments to be described in detail in connection with the accompanying drawings. In the drawings:

FIGS. 1(a) and 1(b) are conventional;

FIG. 14 shows a stationary electron projection beam lithography using a patterned mask;

Figure 1:
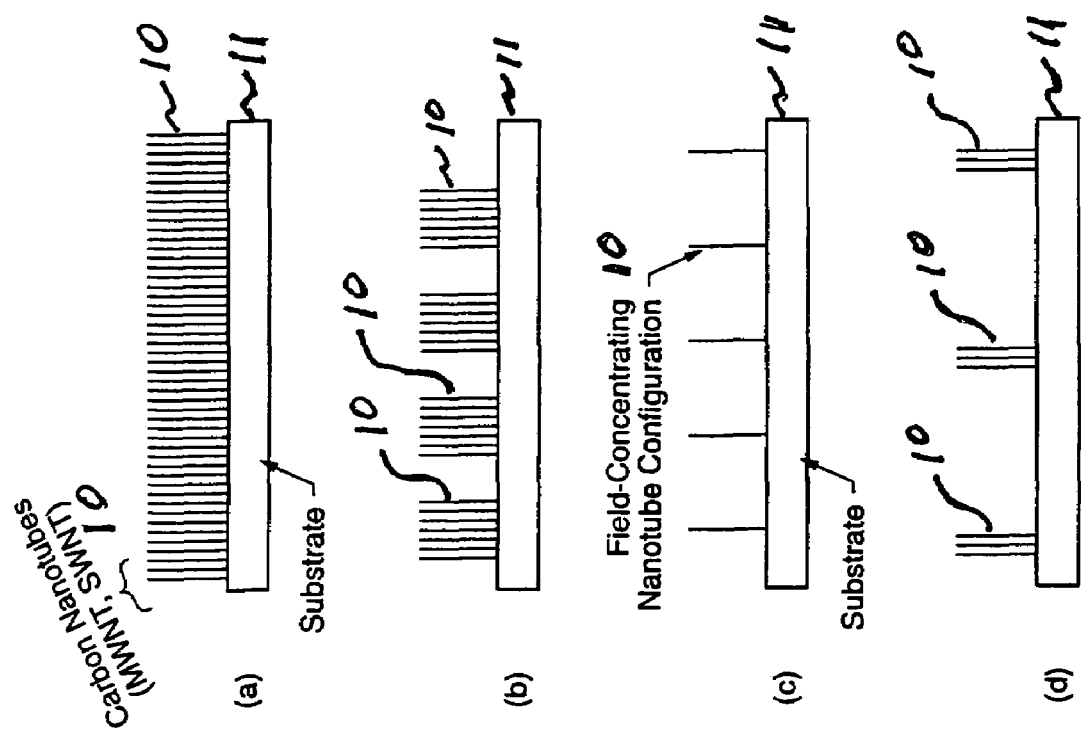
FIG. 1(a)-(d) schematically illustrate various spacing configurations of vertically aligned nanowire structure.

It is to be understood that these drawings are to illustrate the concepts of the invention and are not to scale.

DETAILED DESCRIPTION OF THE INVENTION

This description is divided into two parts. Part I describes methods of growing arrays of spaced apart individual or small groups of nanowires. Part II describes applications of such arrays.

I. Methods

In accordance with one aspect of the invention, methods are provided for growing spaced apart and preferably periodically spaced apart nanowires in central positions for grated field emission structures. Referring to the drawings, FIGS. 2(a) through 2(d) illustrate a substrate workpiece 20 at various steps of a preferred such process.

The first step of the process is to form on a substrate 20 an array of spaced apart nanoscale catalyst metal islands 21. This can be done, for example, by depositing a thin catalyst layer on a silicon substrate and patterning the deposited layer into an array of nanosized islands. The catalyst layer can be cobalt, nickel, iron, tungsten or any other nariowire-inducing catalyst. The nano islands can be patterned into islands 1-100 nm in diameter, preferabbly 1-30 nm in diameter, as by electron beam or focused ion beam lithography. Alternatively, the catalyst nano islands 21 can be directly deposited by depositing catalyst metal through a nano shadow mask, e.g. a mask having an array of 1-30 nm circular holes.

Preferably the islands are formed or deposited at specified locations within each emitter cell, preferably in the center of each emitter cell, corresponding to the middle position of the gate aperture which is to be added later. The center of each cell is defined here as a location on the cathode substrate surface within 30%, and preferably within 20% of the diameter of the gate aperture. The nano islands are preferably deposited in a periodically spaced array with periodic spacing in the range 0.05-100 micrometers depending on the emitter cell spacing, in such a way that there is only one nanowire emitter in the center of each emitter cell. Alternatively there is a small group of less than 10 nano islands centralized in each cell. The nano islands within each group can also optionally be periodically spaced among themselves.

The next step is to coat the nano islands with a coating of protective material such as polymer or metal. The protective coating 22 is to ensure that the nanowire-nucleating catalyst islands survive during the subsequent cathode fabrication process. FIG. 2(a) shows a substrate 20 with a plurality of spaced apart catalyst nano islands 21, each within a protective coating 22.

The third step is to form the three dimensional cathode structure in registration with the coated nano islands. The cathode structure is typically formed by applying a thin dielectric layer and a conductive gate layer. Then a dielectric pillar structure and gate apertures are photolithically patterned and etched to form an array of apertures in the gate layer in registration with the coated nano islands. FIG. 2(b) shows the dielectric pillars 23 and an overlying conductive gate layer 24 forming apertures 25 above the coated nano islands 21. The gate layer can be a continuous metal layer such as 50-200 nm thick molybdenum or tungsten on which the electron-extracting gate voltage is applied in common to to all the emitter cells. Alternatively, the lithographic patterning of the gate structure can be done in such a way that each gate applies the electron-extracting voltage only to its own cell. In this case, the gate voltage can be actively controlled to adjust the emission current from each emitter, for example, by using a feedback circuit, so that the emission current from all the cells are equalized and the electron beam intensity is made uniform. Such beam uniformity is especially useful for broad e-beam applications such as e-beam projection lithography. The maximum variation in the feedback-controlled e-beam source is advantageously less than 20%, deviation from the average e-beam intensity and preferably less than 10%.

The next step, illustrated in FIG. 2(c), is to remove the protective coating 22, uncovering nano islands 21. The protective coating is advantageously chosen to be removable by dissolving in solvent, acid or base solutions or by plasma etching.

The fifth step is to grow the nanowires from each nano island catalyst position. Advantageously the growth is effected by the chemical vapor deposition (CVD) process. The vertical alignment of the nanowire during growth can be enhanced by an electrical field globally applied along the vertical direction (perpendicular to the substrate) or by an intrinsically present electric field, as is used in microwave plasma CVD growth (see Bower et al.). FIG. 2(d) shows the gate structure with individual nanowires 26 vertically grown from nano islands near the center of the gated emission apertures 25.

The term "nanowire" as used herein refers to "an elongated structure with either a uniform or a gradient diameter and the aspect ratio (length-to-averaged diameter) of at least 5, preferably at least 20. The averaged diameter of a nanowire is less than 1 micrometer and preferably less than 200 nm.

Figure 2:
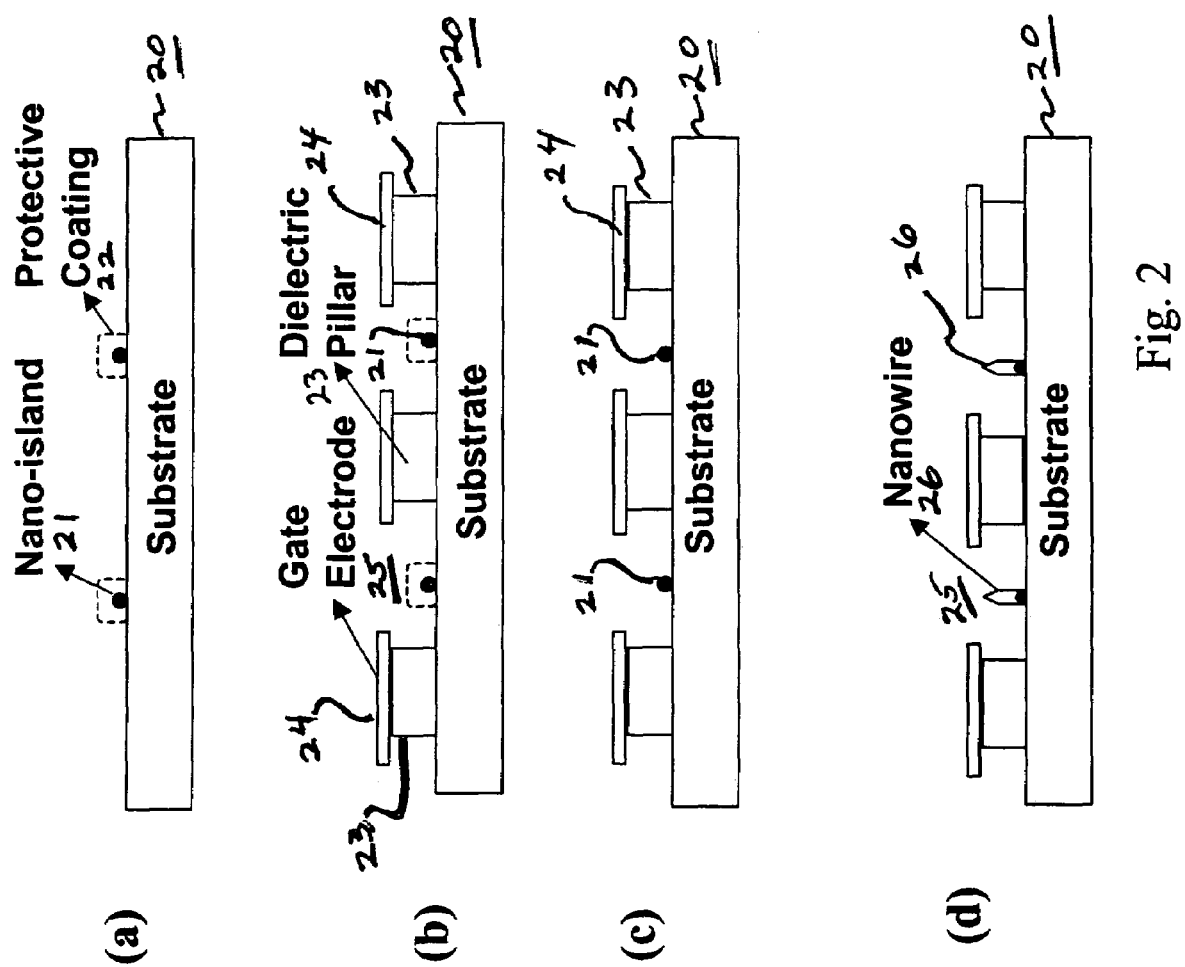
FIGS. 2(a)-(d) show steps in a process of fabricating a field emitter structure having one or a small group of nanowire emitters localized in central regions within respective gate apertures.

As illustrated in FIGS. 3(a), 3(b) and 3(c), the nanowires structures prepared by the method of FIG. 2 can be nanotubes, nanorods or nanoribbons. Nanowire emitters can be carbon-based, metal-based, or ceramic-based. They can have different geometries such as a cylinder 30, a pointed cylinder 31 or a pointed needle 33.

Figure 3:
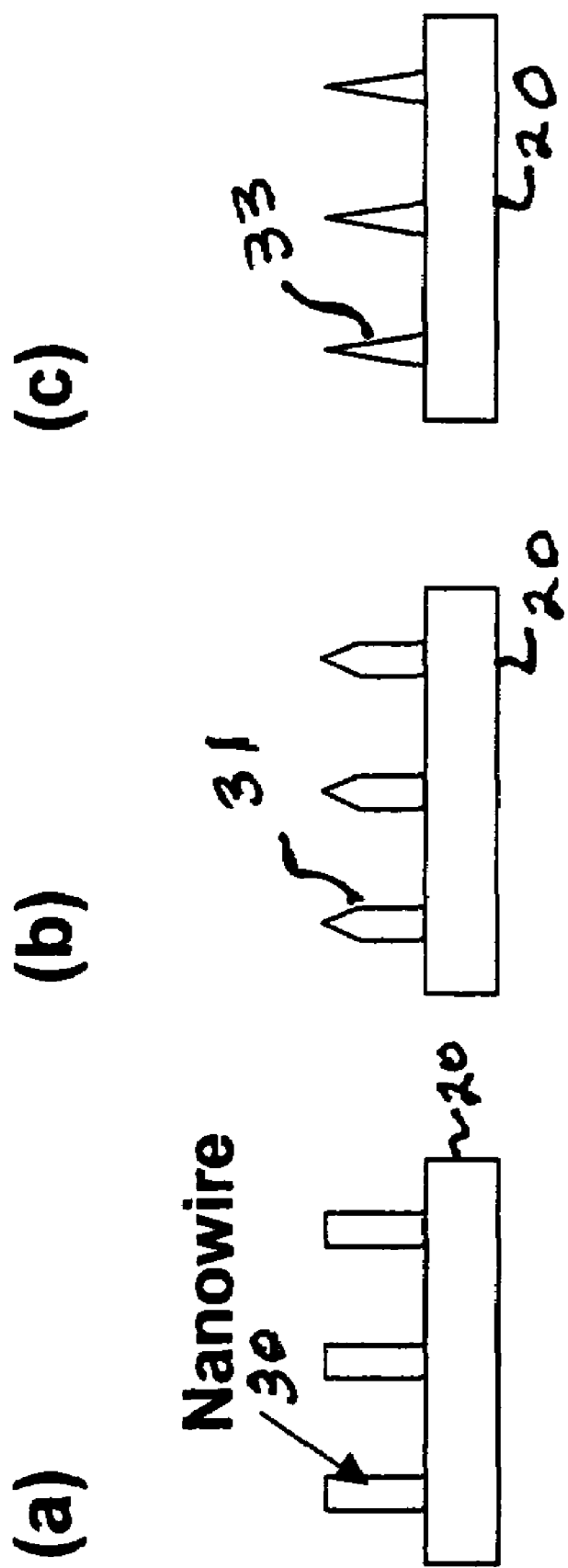
FIGS. 3 (a)-(c) illustrate various shapes of useful nanowires.

Very small diameter nanowires are in general less stiff and fragile, and hence are more susceptible to bending in the presence of local growth stresses, thermal stresses, and their gradients. This is less preferable for emitters as the nanowire emitter tips will then be off-the-center with respect to the gate aperture, and the electron emission direction can deviate from the desired vertical direction. Since the emitter tip sharpness is more important for field concentration than the average diameter of the nanowire, an improved field emitter geometry is based on larger diameter base with a gradually tapering and decreasing diameter toward the emitter tip, as illustrated in FIG. 3. In such uniformly or non-uniformly tapered emitter geometry, the desired larger-diameter base is at least 100 nm, and preferably at least 500 nm. The tip radius of curvature is advantageously smaller than $1/10$ and preferably smaller than $1/50$ of the base diameter. Such a tapered structure can be obtained, for example, by time-dependent control of the CVD gas supply rate and growth conditions.

Figure 4:
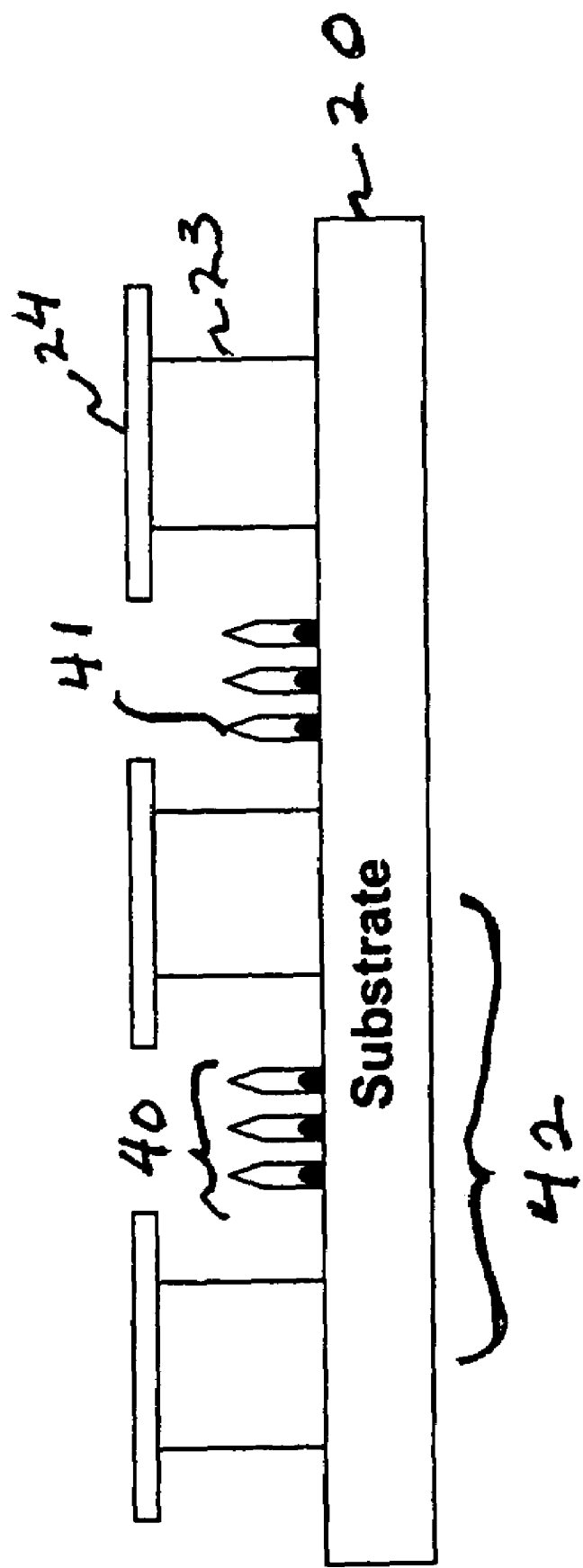
FIG. 4 shows a field emitter structure in which a small group of several nanowire emitters are formed underneath the gate electrode near the center of the gate aperture.

While a single emitter per cell is ideal, sometimes there is a need for back-up emitter nanowires in each cell in case one or more emitters fail. FIG. 4 shows such a structure having a group 40 of plural emitters 41 in each cell 42. The desirable number of emitters per cell is preferably 10 or less, even more preferably 3 or less, and they are preferably localized near the center of the cell 42 by location of the nano islands in the process of FIG. 2.

Figure 5:
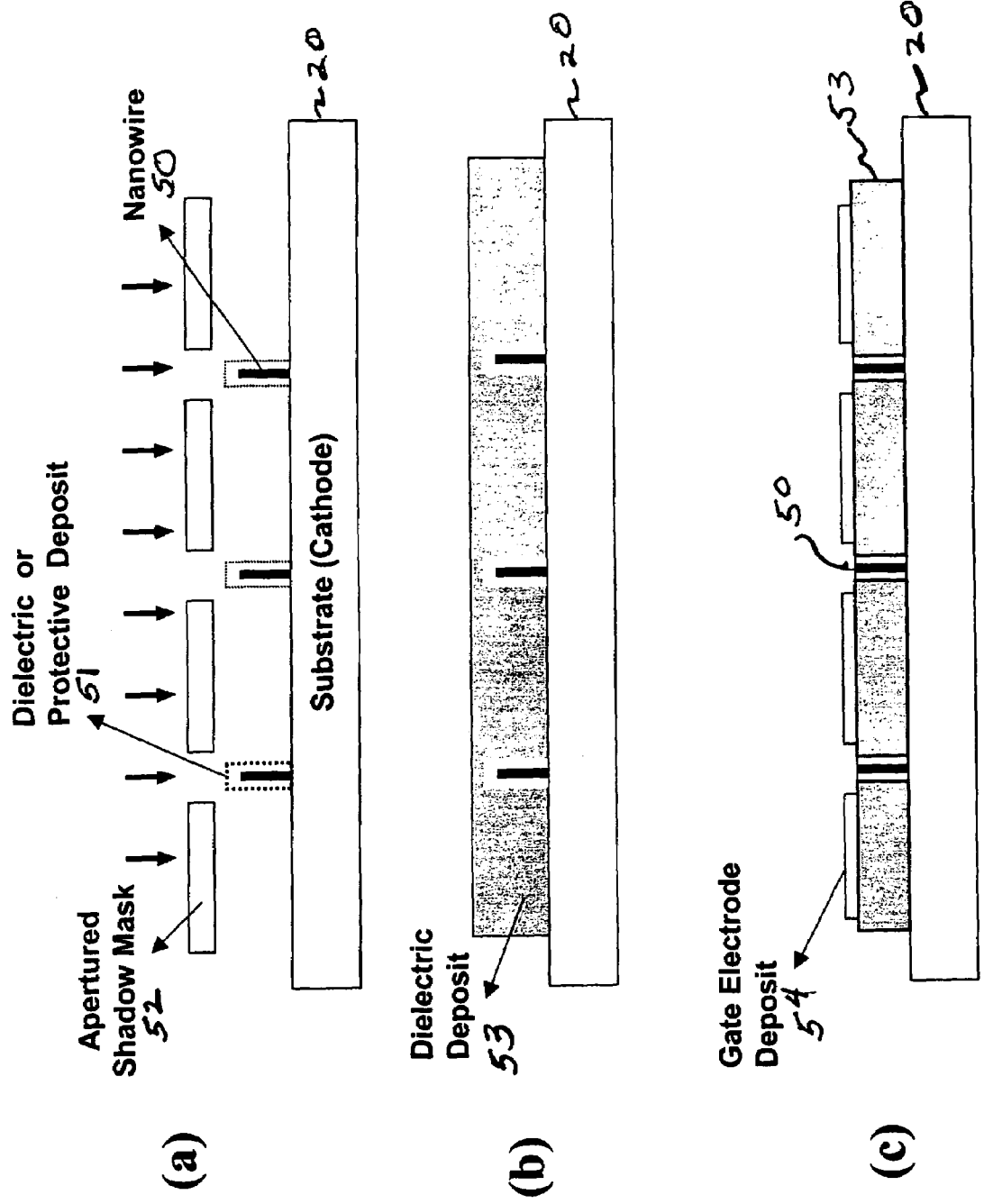
FIGS. 5 (a)-(c) illustrate an alternative process involving (a) depositing protective or dielectric layer through a shadow mask, (b) global deposition of dielectric layer, and (c) planarization and deposition of gate electrode structure.

FIGS. 5 (a)-(c) illustrate an alternative process of fabricating a single emitter (or small group of emitters) per cell structure. An array of spaced-apart nanowires 50 are grown first on the substrate, then they are coated with protective layer 51 as by sputtering or vacuum evaporation of a dielectric layer 51 through a shadow mask 52 (FIG. 5(a)). To ensure the coating of the side of the nanowires, the shadow mask can optionally be moved slightly sideways and the deposition angle slightly tilted. The substrate may also be rotated during deposition so as to facilitate a uniform coating around the nanowire diameter. A global deposition of dielectric layer 53 is then carried out (FIG. 5(b)), and then the layer 53 is polished or planarized to expose emitter tips followed by formation of patterned gate electrodes 54 over the dielectric layer (FIG. 5(c)). An array of gate apertures is formed in registration with the array of exposed emitter tips.

Figure 6:
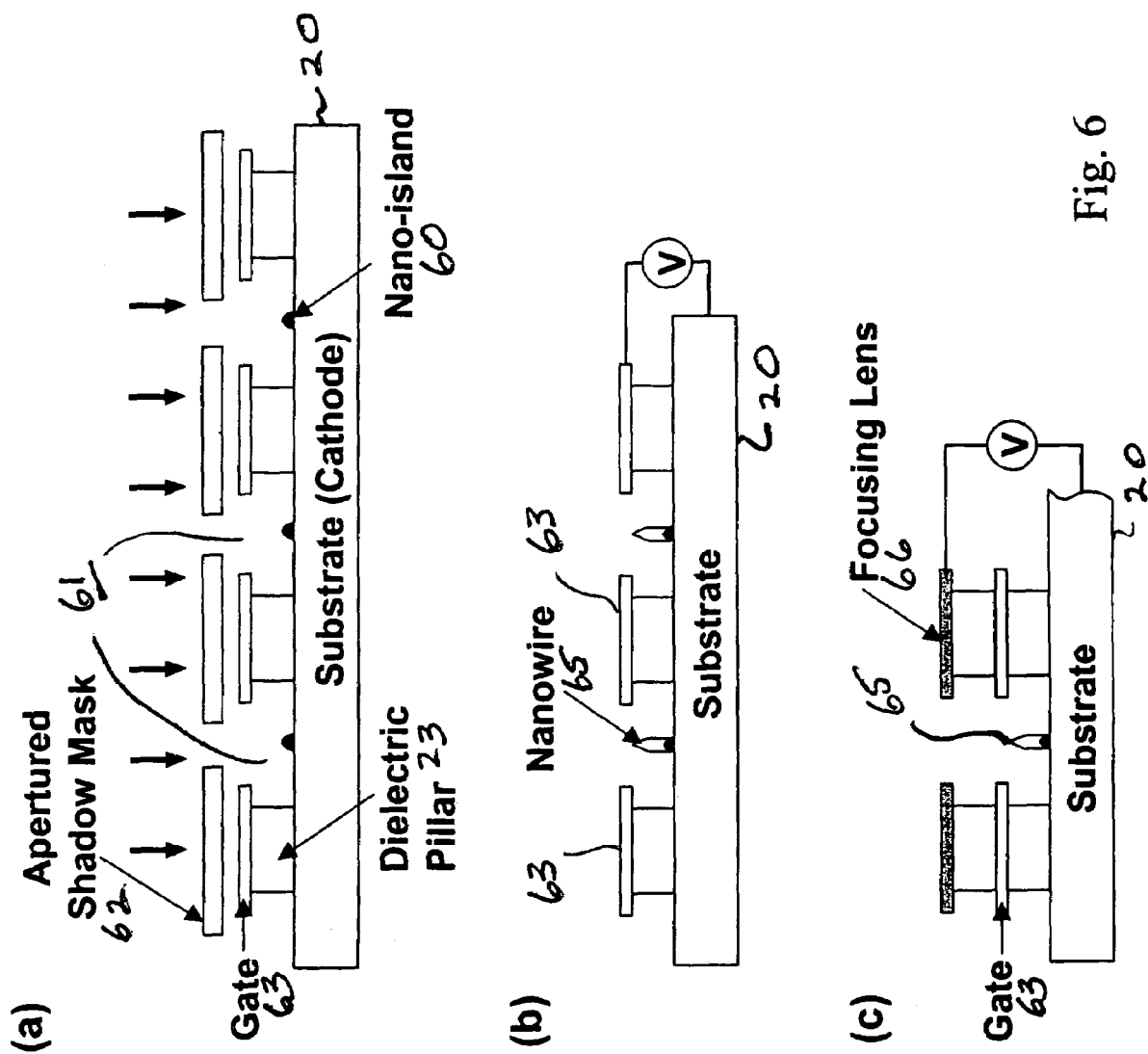
FIGS. 6(a) and 6(b) show an alternative process of making a single nanowire per field emission cell by (a) depositing one nanoscale catalyst island per each cell by using shadow mask, (b) applying in-situ electric field during CVD growth process so that the nanowires grow vertically and toward the center of the gate aperture.
FIG. 6(c) shows a variation of the process utilizing a focusing lens electrode for applying the nanowire-aligning electric field.

Another method of fabricating a single nanowire (or a few nanowires) per field emission cell is illustrated in FIGS. 6(a), 6(b). Here the catalyst islands 60 are deposited into the already prepared cell apertures 61 by using a shadow mask 62 as illustrated in FIG. 6(a). As described earlier, the vertical alignment of nanowire during CVD growth can be enhanced by globally applied DC or RF electric field or intrinsically present electric field, for example, in the case of microwave plasma CVD environment. An alternative way of applying the aligning field is to utilize the existing gate structure. In order to grow aligned nanowires desirably pointing toward the center of the gate aperture, an in-situ electric field is applied between the gate 63 and the substrate cathode 20 during CVD growth of nanowires 65, FIG. 6(b).

Because of the proximity of the gate to the growing nanowire tip, a relatively low voltage can be applied to provide a very large, local, aligning electric field and thus induce efficient vertical nanotube growth. At the early stage of nanotube nucleation and growth when the nanotube tip is well away from the aperture edge, an opposite polarity field may be applied to attract the nanotube to grow vertically. As the nanotube grows taller and approaches the gate, the nanotube position in the middle becomes unstable and it will tend to get attracted and undesirably bend toward the edge of the aperture. The applied field is then either turned off or the polarity of the gate is switched to the same as that for the cathode (nanotube tip) so that the nanotube tip is repelled from the aperture edge and forced toward the center of the aperture hole.

FIG. 6(c) shows a variation of the process in which a focusing lens electrode 66 distal to the gate electrode 63 applies the nanowire-aligning electric field.

The adhesion of nanotubes onto substrate such as silicon is generally not particularly strong. Even in the preferred case of "base-growth" where the catalyst metal particles react with silicon substrate and form bonding/anchoring connections via silicide formation, it has been observed that some nanotubes can be plucked out in the presence of applied electric field during cold cathode operation. The pulled out nanowires can cause electrical shorts between the cathode and the gate electrodes. It is therefore desirable to ensure that the nanotube remains in position by strong adhesion to the substrate. One approach to enhance the adhesion of nanotubes is to provide a long post-growth heat treatment (e.g., ~900° C./24 h). The treatment enhances adhesion. It is believed to cause silicon carbide bonding formation at the interface between carbon nanotubes and a silicon substrate.

Figure 7:
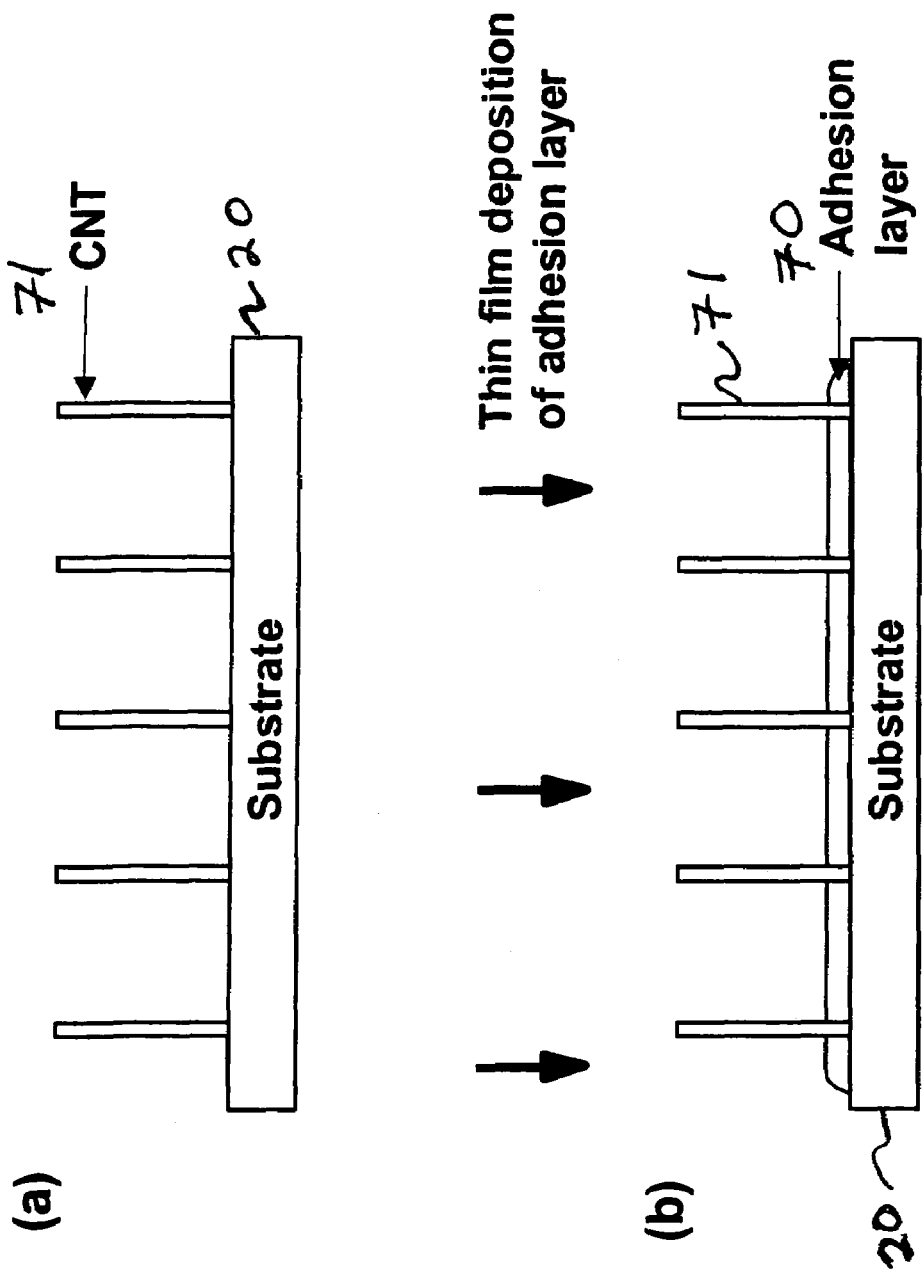
FIGS. 7(a) and 7(b) illustrate a method of improving the nanowire adhesion to the substrate.

Another approach, illustrated in FIGS. 7(a), 7(b), 7(c) is to deposit a relatively thick conducting metal layer 70 between nanowires 71 vertically aligned on a substrate. The metal may be sputter deposited over the nanowires 71 so that the bottom part of the nanowire length is buried in the deposited metal layer. For example, a 300 nm Mo film can be deposited to adhere 2 micrometer long nanotubes.

Figure 8:
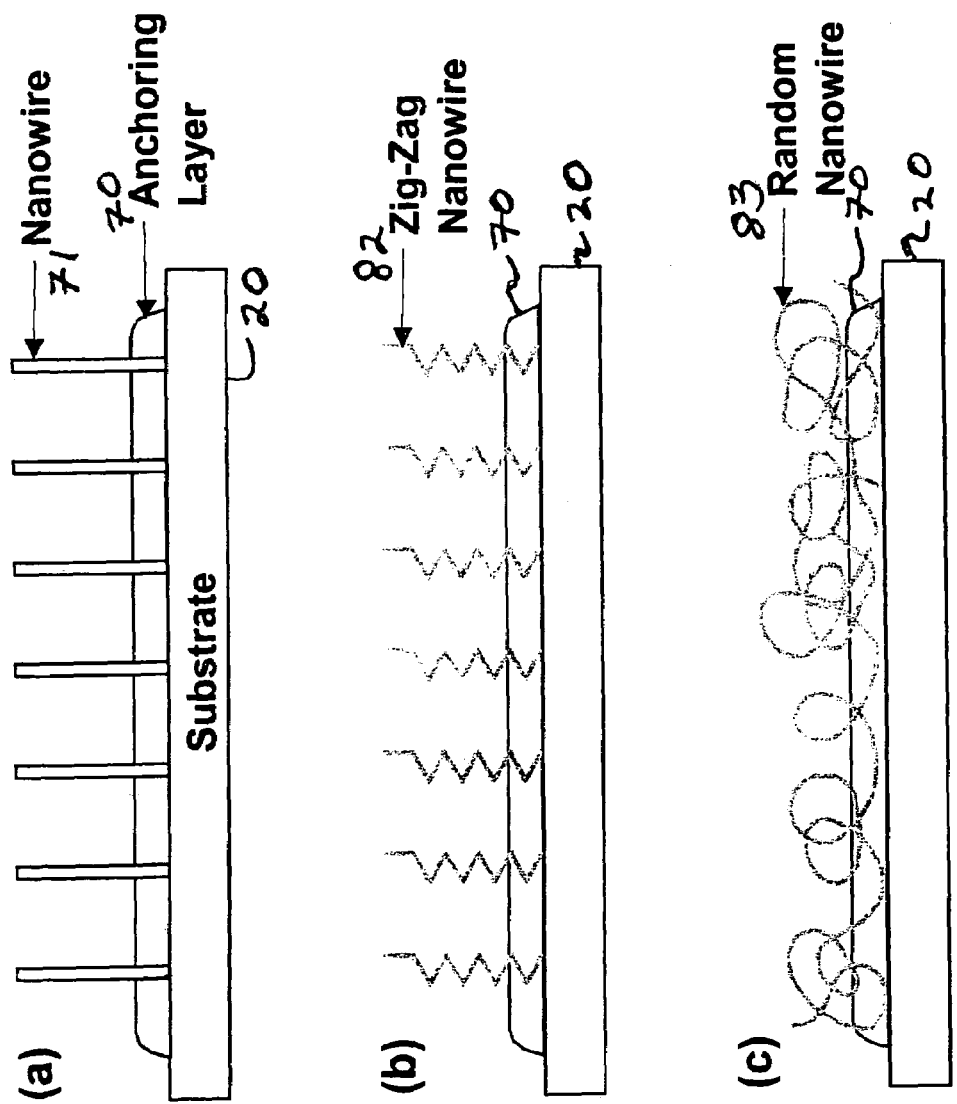
FIG. 8(a)-8(c) show improving nanowire adhesion by utilizing the shape of the nanowire configuration.

As illustrated in FIGS. 8(a), 8(b) and 8(c), adhesion can be further enhanced by the shape of the nanowires. Zig-zag nanowires 82 and random nanowires 83 will be more firmly secured by an adhesive layer 70 than will straight nanowires 71.

The spaced-apart and aligned nanowires according to the invention can be periodically placed (such as in a square or hexagonal arrangement) or can be randomly arranged depending on the pattern shape in a shadow mask. In general, a periodic arrangement is preferred for simplicity and predictability. The desired space between neighboring, vertically aligned nanowires in a FIG. 1(c) configuration is such that the ratio of nanowire spacing to the nanowire height is at least 0.2, preferably at least 0.5, even more preferably at least 1.0. The desired nanowire or nanotube averaged diameter is typically in the range of 1-500 nm, preferably in the range of 1-50 nm. In the case of tapered nanowires, a much larger base diameter is acceptable. The desired nanowire height is in the range of 0.1-200 microns, preferably 0.5-50 microns, with an aspect ratio (length-to-diameter ratio) typically in the range of 10-10000. The nanowires incorporated in this invention can be carbon nanotubes or other types of nano-scale fibers such formed from metals, alloys, or semiconductors such as Si or Ge, or from ceramics such as carbides, nitrides, borides, or oxides. The nanowires can be composite nanowires coated, for example, with another material having a lower work function or more robust surface characteristics in the field emission environment. Electrically insulating nanowires may be coated with conductive materials such as thin layers of metal.

II. Applications

In another aspect of the invention, the centered arrays of periodic and spaced-apart aligned nanowires may advantageously be utilized for various device or processing tool applications. For example, such desirably configured nanowires with significantly enhanced field concentrating capability can be utilized as an improved field emission cathode for a microwave amplifier device or for field emission flat-panel displays. Such nanowire arrays can also be useful as powerful electron sources for electron beam lithography or for electron projection lithography, especially if they are also structured to steer the electron beam. The centered arrays can also be used as high-resolution displays based on steerable electron sources and as high-resolution x-ray source arrays.

These devices and applications will now be described in greater detail.

A. Microwave Amplifiers

Carbon nanotubes are attractive as field emitters because their unique high aspect ratio (>1,000), one-dimensional structure and their small tip radii of curvature (~10 nm) tend to effectively concentrate the electric field. In addition, the perfect atomic arrangement in a nanotube structure imparts superior mechanical strength and chemical stability, both of which make nanotube field emitters robust and stable, especially for high current applications such as microwave amplifier tubes. Microwave vacuum tube devices, such as power amplifiers, are essential components of many modern microwave systems including telecommunications, radar, electronic warfare and navigation systems. While semiconductor microwave amplifiers are available, they generally lack the power capabilities required by most microwave systems. Microwave vacuum tube amplifiers, in contrast, can provide higher microwave power by orders of magnitude. The higher power levels of vacuum tube devices are the result of the fact that electron can travel orders of magnitude faster in a vacuum with much less energy losses than they can travel in a solid semiconductor material. The higher speed of electrons permits the use of the larger structure with the same transit time. A larger structure, in turn, permits a greater power output, often required for efficient operations.

Microwave tube devices typically operate by introducing a beam of electrons into a region where it will interact with an input signal and deriving an output signal from the thus-modulated beam. See A. W. Scott, *Understanding Microwaves*, Ch 12, page 282, John Wiley and Sons, Inc., 1993, and A. S. Gilmour, Jr., *Microwave Tubes*, Artech House, Norwood, Mass., 1986. Microwave tube devices include gridded tubes, klystrons, traveling wave tubes or crossed-field amplifiers and gyrotrons. All of these require a source of emitted electrons.

Traditional thermionic emission cathode, e.g., tungsten cathodes, may be coated with barium or barium oxide, or mixed with thorium oxide, are heated to a temperature around 1000° C. to produce a sufficient thermionic electron emission current on the order of amperes per square centimeter. The necessity of heating thermionic cathodes to such high temperatures causes a number of problems: it limits their lifetime, introduces warm-up delays and requires bulky auxilliary equipment. Limited lifetime is a consequence of the high operating temperature that causes key constituents of the cathode, such as barium or barium oxide, to evaporate from the hot surface. When the barium is depleted, the cathode (and hence the tube) can no longer function. Many thermionic vacuum tubes, for example, have operating lives of less than a year. The second disadvantage is the delay in emission from the thermionic cathodes due to the time required for temperature ramp-up. Delays up to 4 minutes have been experienced, even after the cathode reaches its desired temperature. This length of delays is unacceptable in fast-warm-up applications such as some military sensing and commanding devices. The third disadvantage is that the high temperature operation requires a peripheral cooling system such as a fan, increasing the overall size of the device or the system in which it is deployed. The fourth disadvantage is that the high temperature environment near the grid electrode is such that the thermally induced geometrical/dimensional instability (e.g., due to the thermal expansion mismatch or structural sagging and resultant cathode-grid gap change) does not allow a convenient and direct modulation of signals by the grid voltage alterations. These problems can be resolved or minimized if a reliable cold cathode can be incorporated. Accordingly, there is a need for an improved cold-cathode based electron source for microwave tube devices which does not require high temperature heating. Such cold cathode type microwave amplifier device was disclosed by Goren, et al. in U.S. Pat. No. 6,297,592 issued on Oct. 2, 2001, and entitled "Microwave vacuum tube device employing grid-modulated cold cathode source having nanotube emitters". Sources using these carbon nanotubes provide electrons for microwave vacuum tubes at low voltage, low operating temperature and with fast-turn-on characteristics.

Figure 9:
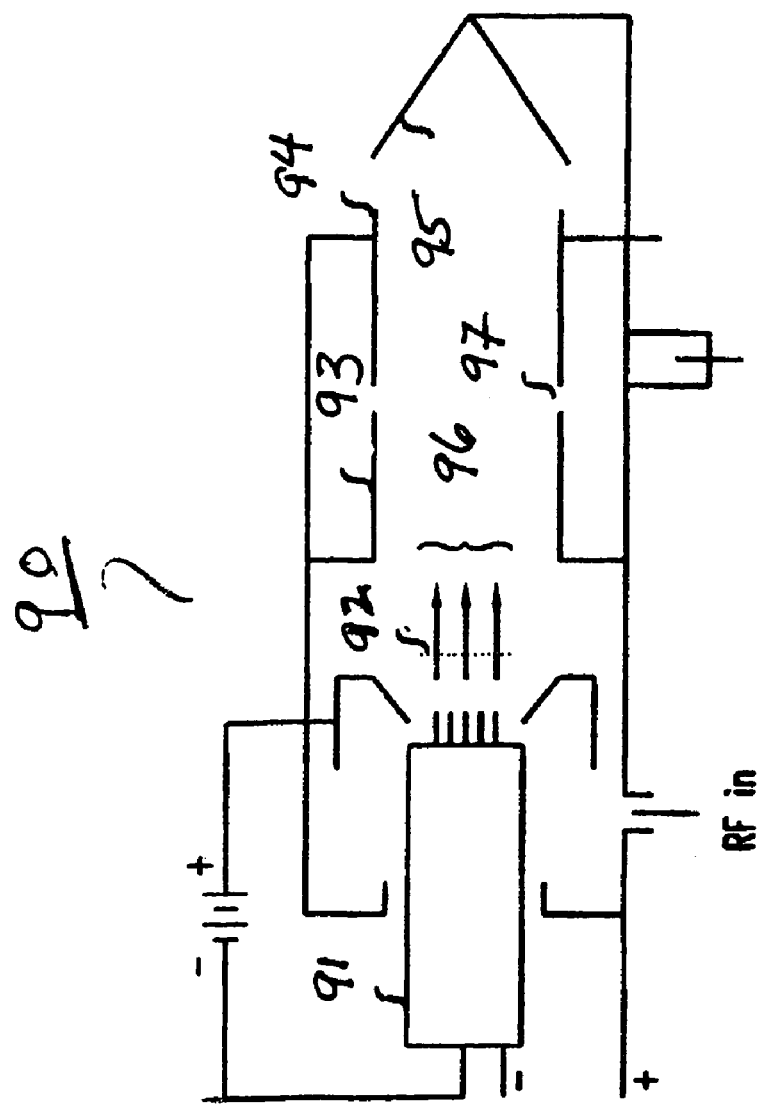
FIG. 9 illustrates a microwave amplifier comprising the periodically spaced-apart nanowires.

FIG. 9 is a schematic cross-sectional illustration of an exemplary inventive microwave vacuum tube 90 comprising spaced-apart nanowire cold cathode, which is basically of "klystrode" type. The klystrode structure is of gridded tube type (other types of gridded tubes include triodes and tetrodes). The inventive device contains 5 main elements—a cathode 91, a grid 92, an anode 93, a tail pipe 94, and a collector 95. The whole tube is optionally placed in a uniform magnetic field for beam control. In operation, a RF voltage is applied between the cathode 91 and grid 92 by one of several possible circuit arrangements. For example, it is possible for the cathode to be capacitively coupled to the grid or inductively coupled with a coupling loop into an RF cavity containing the grid structure. The cathode 91 contains on its surface facing the anode a multiplicity of nanowire or nanotube emitters, one or a few of them confined in each cell with a vertically aligned configuration. (The gates are not shown in the drawing.) The grid 92 regulates the potential profile in the region adjacent the cathode, and is thereby able to control the emission from the cathode. The resulting density-modulated (bunched) electron beam 96 is accelerated toward the apertured anode 93 at a high potential. The beam 96 passes by a gap 97, called the output gap, in the resonant RF cavity and induces an oscillating voltage and current in the cavity. RF power is coupled from the cavity by an appropriate technique, such as inserting a coupling loop into the RF field within the cavity. Finally, most of the beam passes through the tail pipe 94 into the collector 95. By depressing the potential of the collector 95, some of the dc beam power can be recovered to enhance the efficiency of the device.

This klystrode structure is very efficient because it combines the advantages of the resonant circuit technologies of the high frequency, velocity-modulated microwave tubes (such as klystrons, traveling wave tubes and crossed-field tubes) and those of the grid-modulation technologies of triodes and tetrodes, together with the unique, cold cathode operation using high-current emission capabilities of nanowire field emitters. The inventive cold cathode allows the grid to be positioned very close to the cathode, for direct modulation of the electron beam signals with substantially reduced transit time.

Since efficient electron emission is typically achieved by the presence of a gate electrode in close proximity to the cathode (placed about 1-100 μm distance away), it is desirable to have a fine-scale, micron-sized gate structure with as many gate apertures as possible for maximum emission efficiency and to minimize the heating effect caused by electrons intercepted by the gate grids. The grid in the inventive, cold cathode type, vacuum tube device is made of conductive metals, and has a perforated, mesh-screen or apertured structure so as to draw the emitted electrons yet let the electrons pass through through the apertures and move on to the anode. The apertured grid structure can be prepared by photolithographic or other known patterning technique, as is commercially available. The desired average size of the aperture is in the range of 0.5-500 μm, preferably 1-100 μm, even more preferably 1-20 μm. The grid structure in the present invention can also be in the form of a fine wire mesh screen, typically with a wire diameter of 5-50 μm and wire-to-wire spacing (or aperture size) of 10-500 μm. The aperture shape can be either circular, square or irregular.

Within each aperture area, a multiplicity of optimally spaced-apart nanotube emitters attached on the cathode surface emit electrons when a field is applied between the cathode and the grid. A more positive voltage is applied to the anode in order to accelerate and impart a relatively high energy to the emitted electrons. The grid is a conductive element placed between the electron emitting cathode and the anode. It is separated from the cathode but is kept sufficiently close in order to induce the emission.

The grid can be separated from the cathode either in a suspended configuration or with an electrically insulating spacer layer such as aluminum oxide. The dimensional stability of the grid, especially the gap distance between the cathode and the grid, is important, for example, in the case of unavoidable temperature rise caused by electron bombardment on the grid and resultant change in dimension and sometimes geometrical distortion. It is desirable that the grid be made with a mechanically strong, high melting point, low thermal expansion metal such as a refractory or transition metal. The use of mechanical strong and creep-resistant ceramic materials such as highly conductive oxides, nitrides, carbides, etc. is also possible. The grid is desirably configured to have as much mechanical rigidity as possible.

B. Field Emission Displays

The spaced-apart, aligned and centrally located nanowire emitters can also be utilized to make unique, flat-panel, field emission displays. Here, the term "flat-panel displays" refers to displays with a thickness of less than ~10 cm. Field emission displays can be constructed with either a diode design (i.e., cathode-anode configuration) or a triode design (i.e., cathode-grid-anode configuration). The use of grid electrode is preferred as the field emission becomes more efficient. Advantageously this electrode is a high density aperture gate structure place in proximity to the spaced-apart nanowire emitter cathode to excite emission. Such a high density gate aperture structure can be obtained e.g., by lithographic patterning.

For display applications, emitter material (the cold cathode) in each pixel of the display desirably consists of multiple emitters for the purpose, among others, of averaging out the emission characteristics and ensuring uniformity in display quality. Because of the nanoscopic nature of the nanowires such as carbon nanotubes, the emitter provides many emitting points, but because of field concentration desired, the density of nanotubes in the inventive device is restricted to less than $100/(micrometer)^2$. Since efficient electron emission at low applied voltage is typically achieved by the presence of accelerating gate electrode in close proximity (typically about 1 micrometer distance), it is useful to have multiple gate aperture over a given emitter area to maximally utilize the capability of multiple emitters. It is also desirable to have fine-scale, micron-sized structure with as many gate apertures as possible for maximum emission efficiency.

Figure 10:
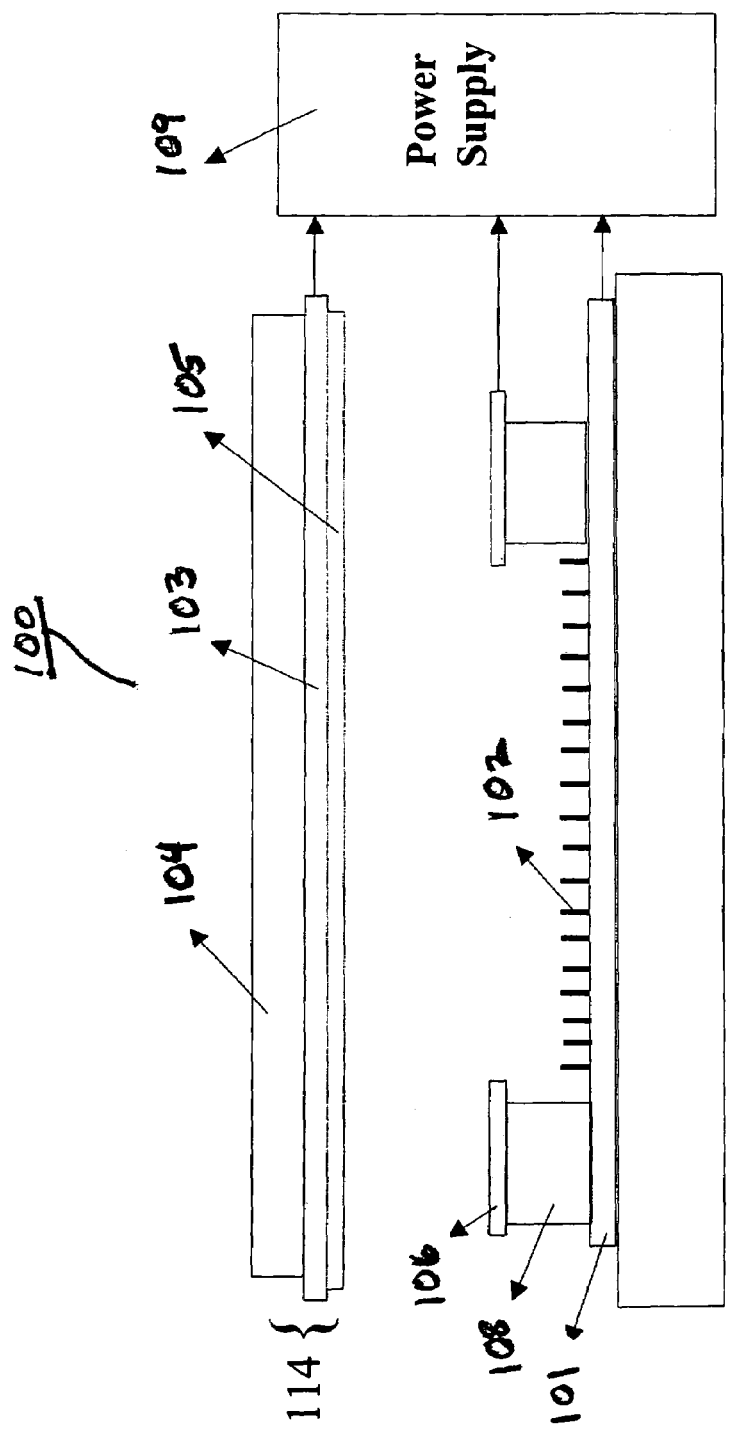
FIG. 10 shows a flat panel display using periodically spaced apart nanowires as field emission cold cathodes.

Referring to the drawings, FIG. 10 shows a field emission display 100 comprising a substrate 101 which also serves as the conductive cathode, a plurality of spaced-apart and aligned nanotube emitters 102 attached on the conductive substrate, and an anode 103 disposed in spaced relation from the emitters within a vacuum seal. The transparent anode conductor formed on a transparent insulating substrate 104 (such as a glass) is provided with a phosphor layer 105 and mounted on support pillars (not shown). Between the cathode and the anode and closely spaced from the emitters is a perforated conductive gate layer 106. Conveniently, the gate 106 is spaced from the cathode 101 by a thin insulating layer 108.

The space between the anode and the emitter is sealed and evacuated, and voltage is applied by power supply 109. The field-emitted electrons from nanotube emitters 102 are accelerated by the gate electrode 106, and move toward the anode conductive layer 103 (typically transparent conductor such as indium-tin-oxide) coated on the anode substrate 104. Phosphor layer 105 is disposed between the electron emitters and the anode. As the accelerated electrons hit the phosphor, a display image is generated. In the improved flat panel field emission display structure, each aperture includes a centralized small group of nanowire emitters or a single centralized nanowire emitter.

Electron Source Array for Nano Lithographic Fabrication

Nano fabrication technologies are crucial for construction of new nano devices and systems as well as for manufacturing of next generation, higher-density semiconductor devies. Conventional e-beam lithography for patterning e-beam resist layers with its single-line writing characteristics is inherently slow and costly. Projection e-beam lithography technology, which is sometimes called as SCALPEL, uses a patterned e-beam mask to produce an e-beam exposed region, as is disclosed in U.S. Pat. Nos. 5,701,014 and 5,079,112 by Berger, et al., and U.S. Pat. No. 5,532,496 by Gaston. The projection e-beam lithography, can be much faster because of an aerial coverage (e.g., each exposure covering ~1 $cm^2$) as compared to single line writing. The inventive gated field emission structures with centralized nanowires can be useful for lower cost, higher throughput e-beam nano fabrication.

Figure 11:
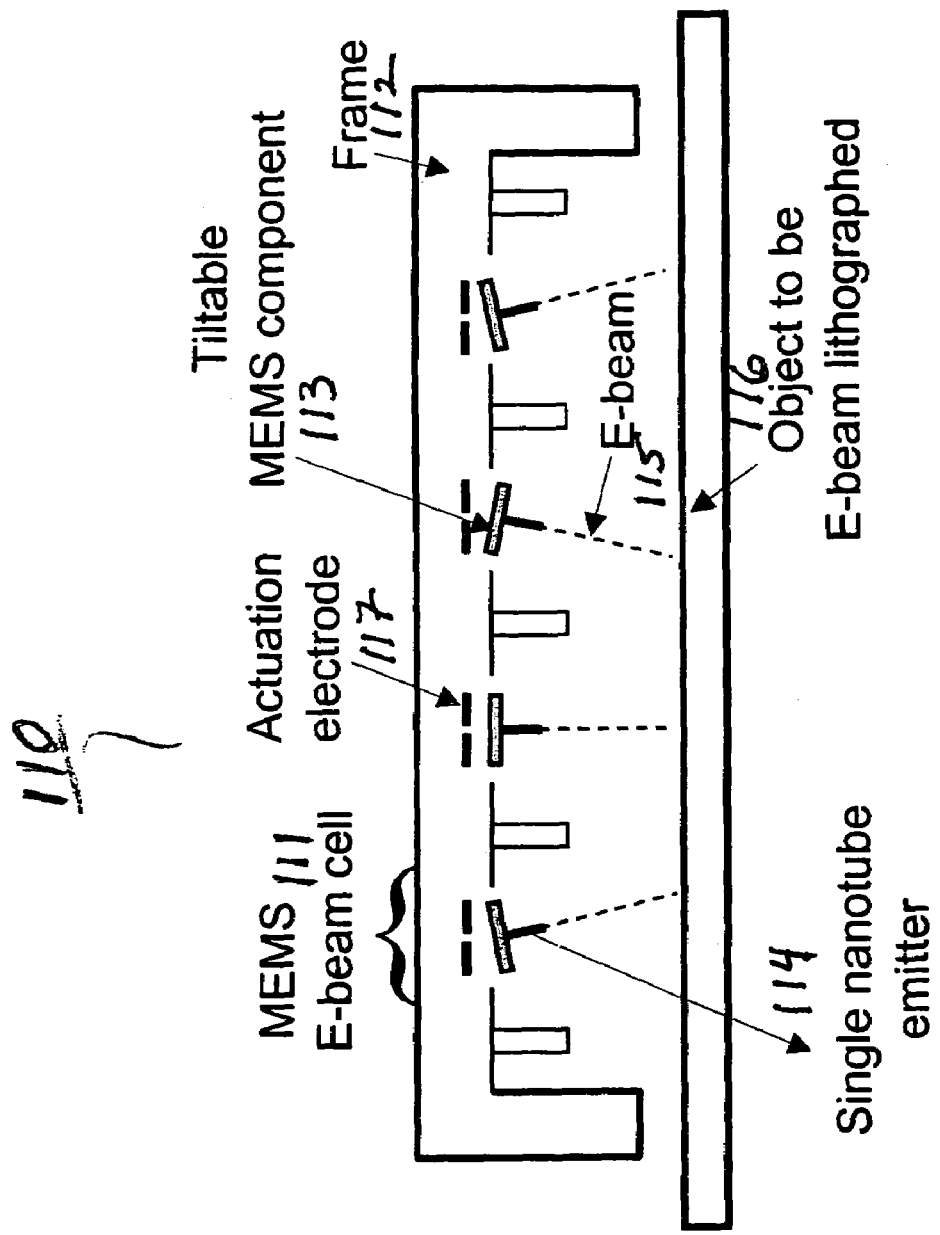
FIG. 11 schematically illustrates an E-beam lithography device using a novel two dimensional array of MEMS steerable nanowire electron sources.

FIG. 11 schematically illustrates an exemplary e-beam lithography apparatus 110 comprising an array of micro electro mechanical system cells (MEMS cells) 111 within a frame 112. Each MEMS cell 111 contains a movable and scannable component 113 with a single electron field emitter 114 for emitting an electron beam 115. Electron extracting gates (not shown) may optionally be added. The object to be lithographed, such as a thin coating 116 of resist material, is, after exposure to the e-beam, chemically etched to develop a nanoscale patterned structure. An exemplary useful resist material is PMMA (polymethylmethacrylate). Alternatively, instead of using the resist material, the scanning e-beams may be allowed to directly bombard a thin metal or ceramic film so that melting and ablation of the material generates a trench or a hole patterned structure.

The movable disk 113 can be of any shape (e.g., circular, square, or triangular). The tilting of movable disk 113 in each cell, and hence the trajectory of field emitted electrons from the nano emitter 114 attached on the movable disk, is controlled to any desired angle by applying a varying intensity of electric fields to electrodes 117 located adjacent the disk. Such a technology for tilting MEMS movable components has been established in recent years. See U.S. Pat. No. 6,201,631 by Greywall (Mar. 13, 2001), U.S. Pat. No. 6,028,689 by Michalicek et al. (Feb. 22, 2000), and U.S. Pat. No. 5,629,790 by Neukermans et al. (Mar. 13, 1997), all three of which are incorporated herein by reference.

The preferred electron emitters 114 are carbon nanotubes. Carbon nanotubes are powerful electron field emitters (See Zhu, et al, "Large Current Density from Carbon Nanotube field Emitters", *Applied Physics Letters*, Vol. 75, No. 6, p. 873, August 1999). The electrons emitted from the tips of carbon nanotubes are utilized, according to this invention, for the two-dimensional e-beam lithography. Since the field emission of electrons is most effective in vacuum where collisions with atoms or ions are minimized, the lithography apparatus is preferably operated at a vacuum level typically used for field emission display.

The MEMS structure illustrated in FIG. 11 can be fabricated by using surface micro-machining such as the MUMPS processing system (Multi User MEMS Processing System), by bulk micro-machining such as the SOI (silicon-on-insulator) process, or by the LIGA process (x-ray lithography and electrodeposition). Such MEMS fabrication processes are described in detail in the literature. See, for example: Marc Madou, *Fundamentals of Microfabrication*, CRC Press, New York 1997, and Gregory T. A. Kovacs, *Micromachined Transducers—Source Book*, McGraw Hill, New York 1998. The MEMS structure according to the invention can be made of a number of alternative materials including polysilicon, single crystal silicon, silicon carbide, diamond or metal.

Figure 12:
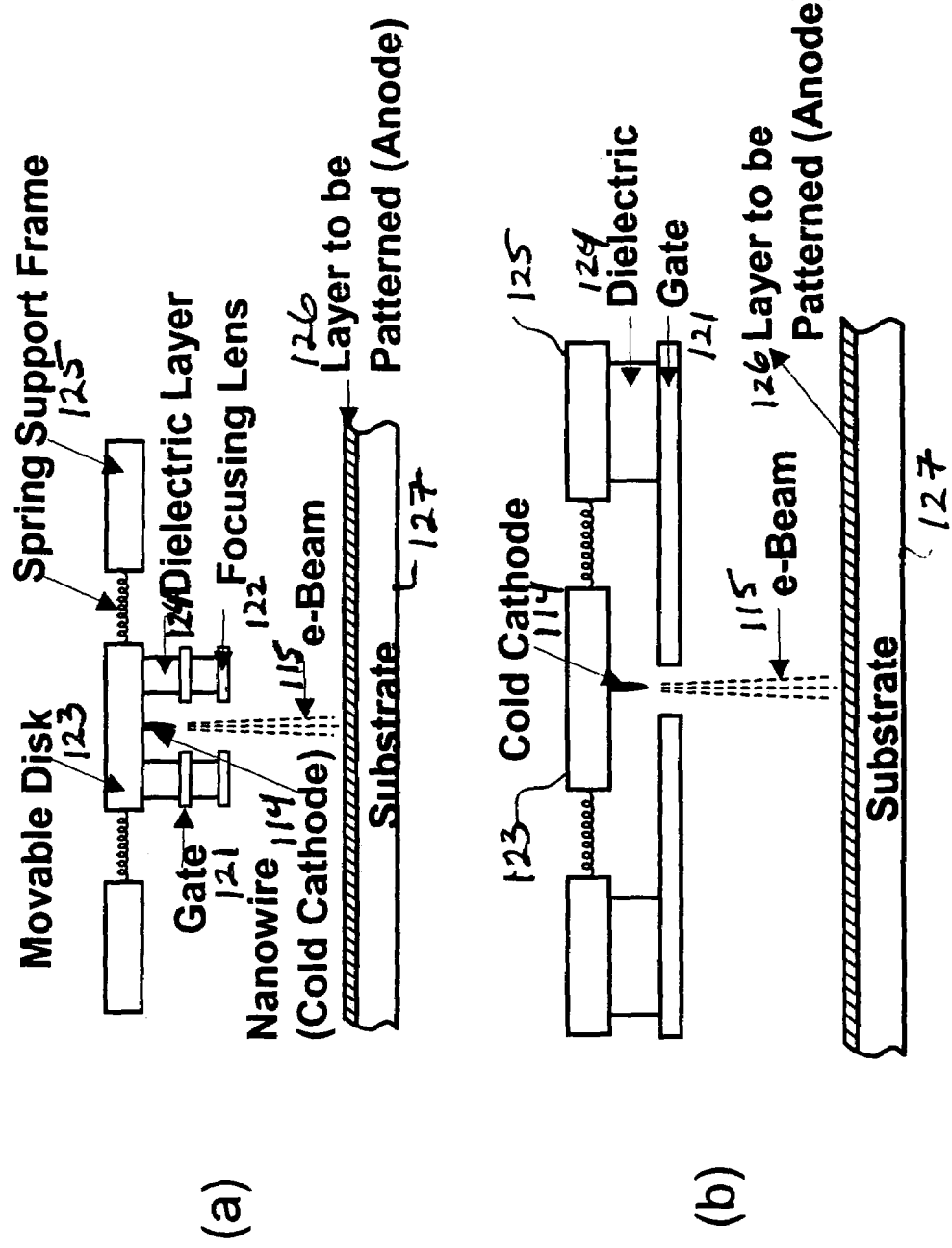
FIG. 12 shows a steerable E-beam lithography device using electron beam focusing electrodes.

FIG. 12(*a*) illustrates lithographic apparatus 120 using gated emitters. A gate 121 and a focusing lens 122 are fabricated on each movable disk 123 using dielectric spacers 124. An alternative structure shown in FIG. 12(*b*) is to attach the gate 121 to the support frame 125 instead of on the movable disk 123. The alternative is advantageous where the angle range of the intended scanning is relatively small, e.g., less than ~10 degrees away from the vertical center line. The layer to be patterned 126 is shown on substrate 127.

Figure 13:
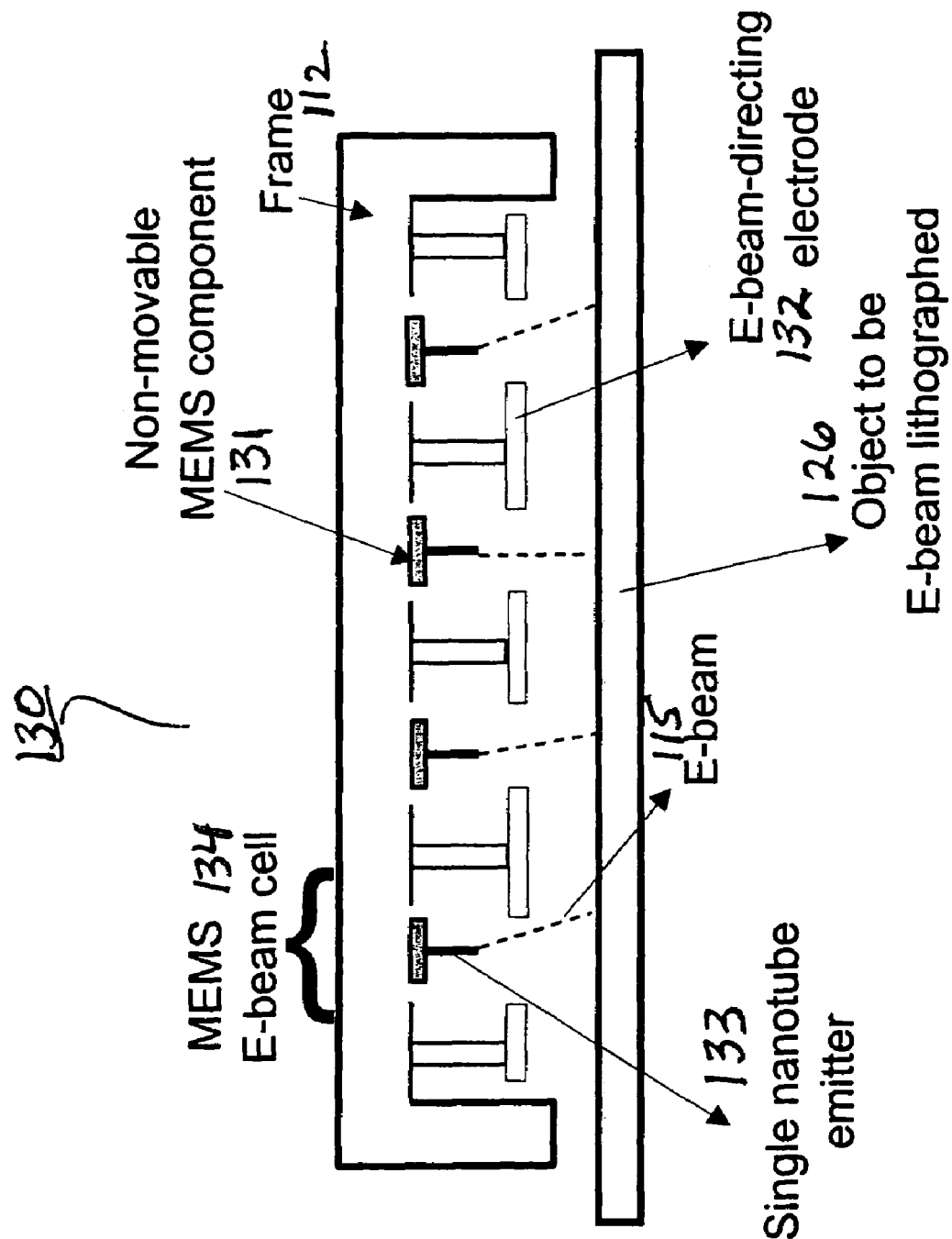
FIGS. 13(a) and 13(b) schematically illustrate (a) an E-beam lithography device using a two dimensional array of electrostatically steerable nanowire electron sources and (b) a subdivided configuration of control electrodes steering an electron beam in the device of FIG. 13(a)
Figure 13B:
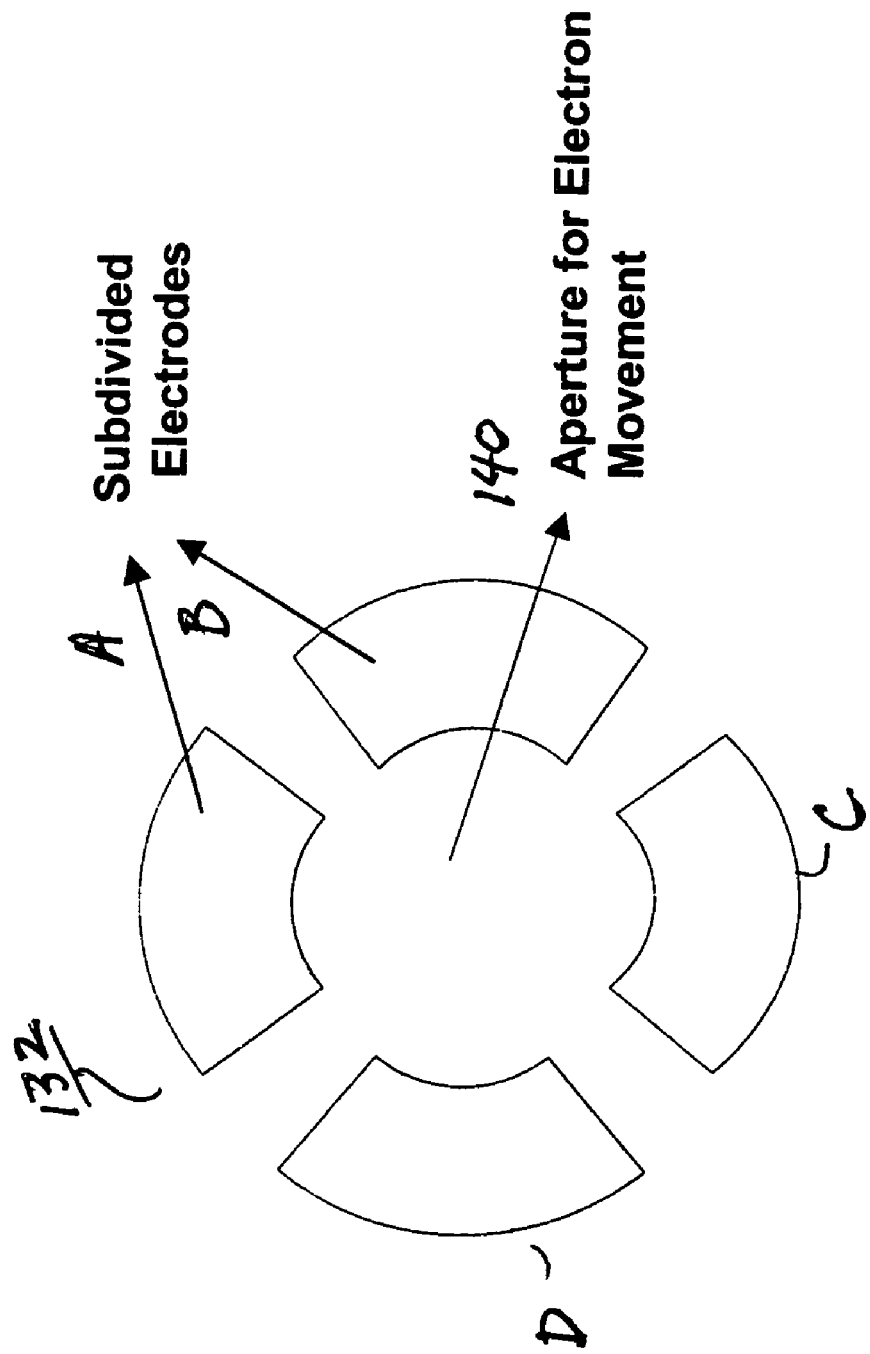

The e-beam can also be steered using only electronic controls, without moving parts. FIG. 13(*a*) illustrates a lithographic apparatus 130 using stationary emitter supports 131 and e-beam directing electrodes 132. In this alternative embodiment, the gate 121 or focusing lens 122 in FIG. 12 can be used to alter the beam direction.

The preferred field emitter 133 is a single nanotube for each cell 134. The single emitter is preferred to a multiplicity of nanotubes to minimize beam spread and perpendicular momentum. A multiple nanotube configuration, while easier to fabricate than the single nanotube, is likely to complicate the electron optics design because of the spread in energy and momentum. However multiple nanotubes could be used if secondary emission material were placed along the electron path to facilitate focussing.

The desired size of each MEMS cell 134 can be determined based on the needs for high throughput weighed against the complexity of fabricating many small cells. If each of the cells in the proposed two-dimensional e-beam lithography tools is designed as 1 (micrometer)$^2$ in size, the total number of the MEMS cells would be ~$10^{11}$. The time required to nano pattern the whole surface of a 12 inch wafer would then be only ~0.01 sec. This is assuming a 10 nm e-beam writing spot size and an exposure time of 1 microsec/spot. If a throughput slower than 0.01 sec/wafer is acceptable, the cell size design can be increased. If one uses a (10 micrometer)$^2$ cell size, which is a more practical and manufacturable dimension, the number of cells on a 12 inch wafer would then be reduced by two orders of magnitude to ~$10^9$. This would then take ~1 second to complete e-beam lithography on a 12 inch wafer. Since only a portion of the 12 inch wafer would actually be written, the more realistic estimate of lithography time would be more like ~0.1 second/wafer. Of course, if the cell size is increased further to ~100 micrometer$^2$, it would take ~100 seconds/wafer (or more realistically, ~10 seconds/wafer). Another compromise that can be considered is to build the two-dimensional e-beam lithography tool in a 2 inch$^2$ size, and carry out the nano patterning stepwise on a 2 inch$^2$ areas. With a 10 micrometer$^2$ MEMS cell, this tool can pattern a 12 inch wafer in ~25 seconds.

The inventive two-dimensional e-beam lithography apparatus can thus provide a high manufacturing throughput without special masks such as those used for projection e-beam lithography. Unlike the projection e-beam lithography, the inventive technique can generate any image on the resist layer material via control of the MEMS cells.

FIG. 13(*b*) illustrates a steering electrode 132 useful in the apparatus of FIG. 13(*a*). By subdividing the gate or focusing lens electrode, e.g., as independently controllable electrode segments A, B, C, D, and applying asymmetric potentials among the electrode segments, the e-beam can be made to project through an aperture 140 toward any selected direction. The electrons tend to move toward the electrode segment with higher applied voltage. The advantage in this approach is elimination of moving components and enhanced long-term reliability.

FIG. 14 schematically illustrates an alternative embodiment using stationary emitter cells with centralized emitters 133 for electron projection lithography. An e-beam projection mask 140 selectively blocks the emitted beams in regions where the beams are not desired and permits their passage in regions where they are desired. In this case, the MEMS tilting or electrode-controlled beam steering is not required. The FIG. 14 e-beam projection lithography tool can be laterally moved, if desired, to pattern different areas of a substrate.

Figure 15:
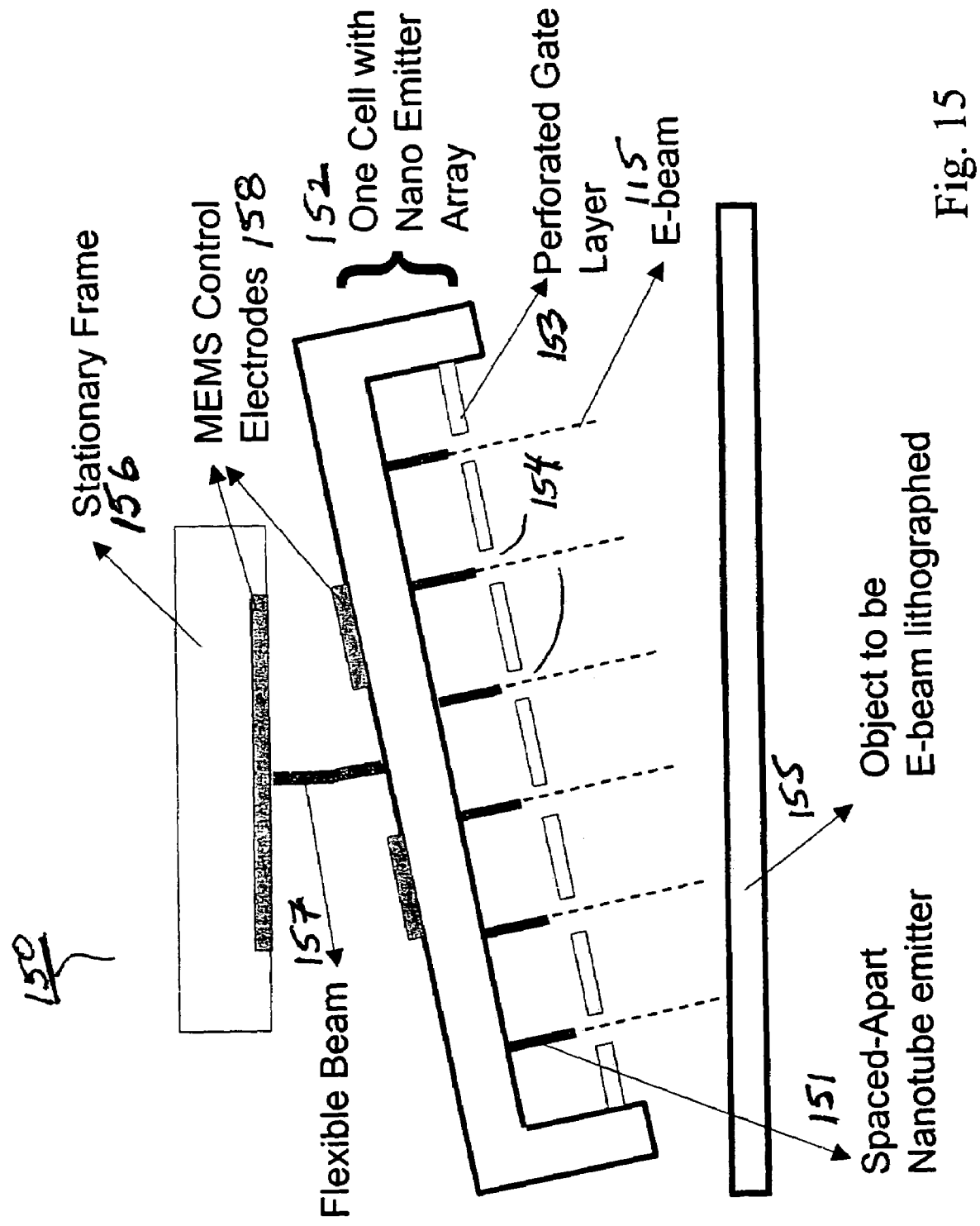
FIG. 15 schematically illustrates an E-beam lithography device using MEMS steerable electron sources.

FIG. 15 shows e-beam lithographic apparatus 150 wherein a multiplicity of field emitters 151 in the same cell 152 are controllable by the same gate grid 153 and steered as a group. Each of the sub-cells in the cell group 152 contains a centralized nanowire emitter or small group. The grid 153 desirably contains apertures 154 (either random or periodic) to efficiently induce emission of electrons from various nanowires and to allow them to accelerate toward the anode 155 (the substrate or device surface to be irradiated). The multiple emitter cell 152 can be coupled to a stationary frame 156 by a flexible MEMs beam 157. The orientation of cell 152 can be controlled by the interaction among a plurality of MEMs electrodes 158.

Such an apparatus 150 is convenient for applications where a broader e-beam rather than a single line, focused e-beam is desired, e.g., for projection e-beam lithography (such as SCALPEL) which requires a broad beam to be directed over a pre-patterned mask. For example, a group of nanotube emitter units (e.g., 10-10,000 units), each optionally having its own e-beam focusing lenses to make the e-beam more parallel and uniform, can provide a beam diameter of e.g., 0.1-10,000 micrometers. On steering and scanning such a group of nano emitters, the area covered by the electron beam can be increased by a factor of 10-1000 as compared to a single emitter. In a further embodiment of the invention, many such groups of e-beam emitter units, each independently steered by MEMS mechanism, can be operated to pattern an even wider substrate area. Care should be exercised to avoid excessive e-beam tilt angle with respect to the e-beam projection mask as this may cause loss of patterning accuracy and resolution.

C. Ultra High Density Displays

The centralized emitter cell structure can also be utilized for design and construction of ultra-high-resolution, flat panel displays. In essence, a phosphor screen assembly and a transparent window are added in front of the electron beam.

Figure 16A:
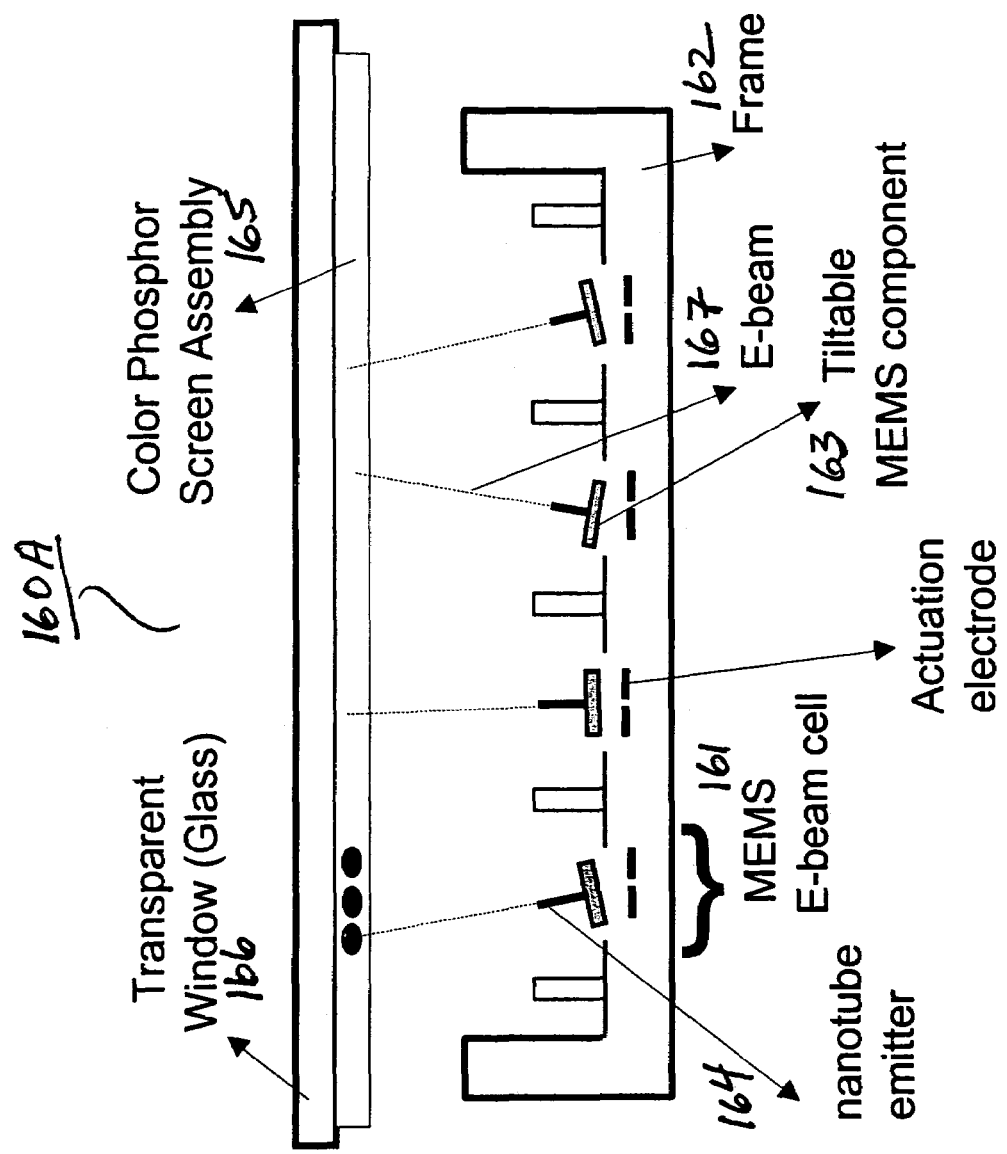
FIGS. 16(a) and (b) schematically illustrate field emission displays according to the invention.
Figure 16B:
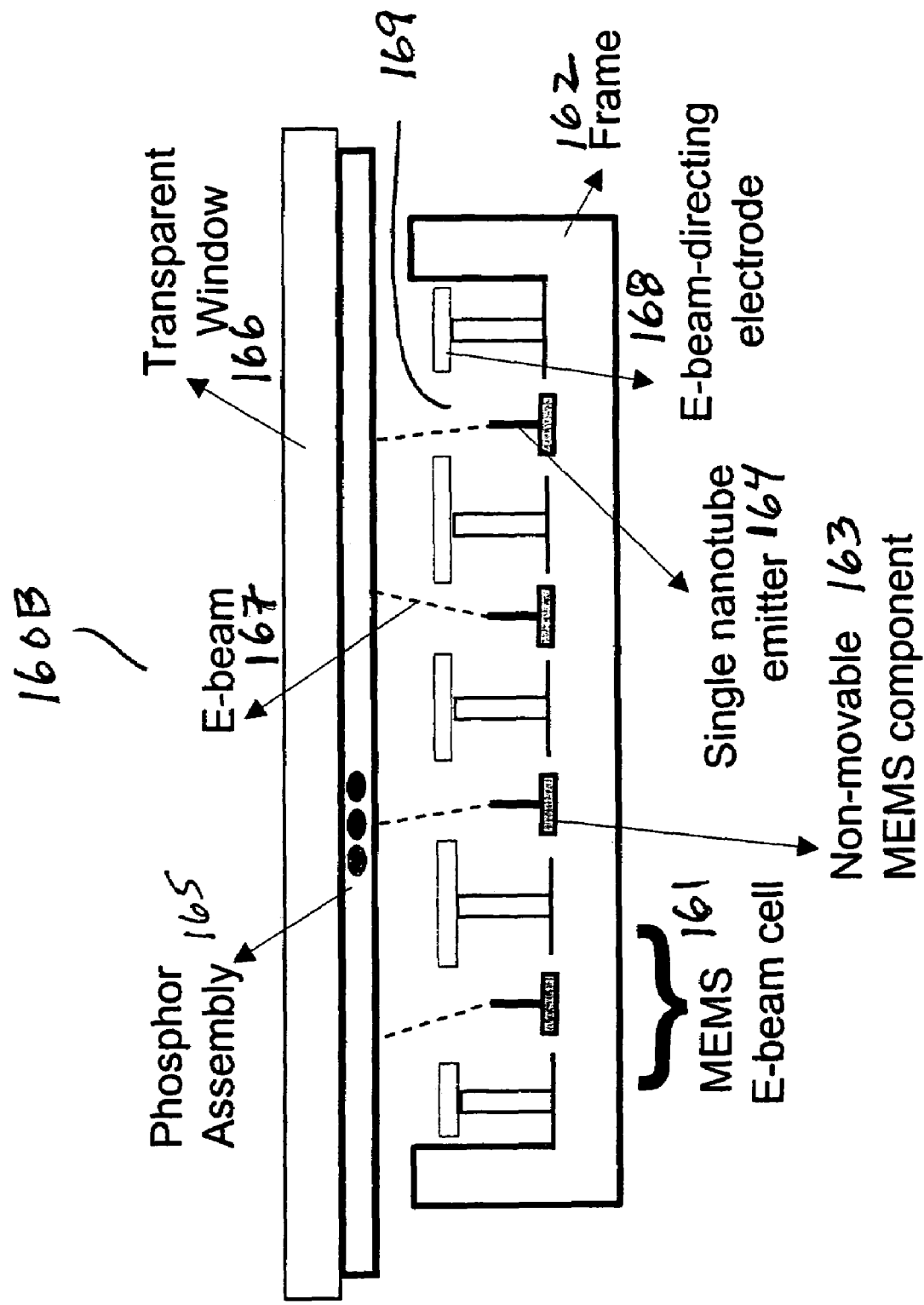

Referring to the drawing, FIG. 16(*a*) schematically illustrates an ultra-high-resolution, flat panel display 160A, optionally comprising an array of MEMS cells 161 within a frame 162. Each cell 161 contains a movable and scannable component 163 with one or several nanoscale electron field emitters 164. A phosphor screen assembly 165 with red-green-blue colors and a transparent glass window 166 are added in front of the electron beam. Phosphor screen technology is well known. (For example see J. A. Castellano, *Handbook of Display Technology*, Academic Press, New York, 1992.)

The diameter of an e-beam arriving at the phosphor screen in the inventive display device will be of the order of 10-1000 nm depending on the distance and focusing mechanisms used. Thus a sharp, high-density-pixel display image can be obtained with a resolution of better than 3 micrometers, preferably better than 1 micrometer, even more preferably better than 100 nm. For color displays, the phosphor screen assembly can contain a distribution of high resolution triads of red-green-blue dots or stripes, with the resolution of phosphor dots preset corresponding to the desired display resolution. For high resolution displays the desired dimension of the phosphor spots is typically less than 30 micrometers, preferably less than 10 micrometers, even more preferably less than 3 micrometers. The MEMS based steerable electron beam is programmed and operated to strike the phosphor dots corresponding to the desired color at the desired location. The neighboring MEMS-steered e-beams may be programmed to have slightly overlapping coverage in order to ensure smooth transition of image near the boundary regions.

The preferred electron emitters are carbon nanotubes. Carbon nanotubes are known to be powerful electron field emitters (see Zhu, et al, "Large Current Density from Carbon Nanotube field Emitters", *Applied Physics Letters*, Vol. 75, No. 6, p. 873, August 1999). The electrons emitted from the tips of carbon nanotubes are utilized in the two-dimensional, steerable e-beam sources. Since the field emission of electrons is most effective in vacuum where collisions with atoms or ions are minimized, the device is preferably operated at a vacuum level typically used for field emission display.

The preferred directional control elements are MEMS cells 161. The display comprises an array of MEMS cells 161, and each of the MEMS cells 161 contains a movable disk component 163 of any shape (circular, square, triangular, etc.). The tilting of the movable disk 163 in each cell and hence the trajectory of field emitted electrons from the nano emitter 164 attached on the movable disk is controlled to any desired angle by applying a varying intensity of electric fields to electrodes 167 located adjacent the disk. Such a tilting technology for MEMS movable components has been established in recent years. See U.S. Pat. No. 6,201,631 by Greywall (Mar. 13, 2001), U.S. Pat. No. 6,028,689 by Michalicek et al. (Feb. 22, 2000), and U.S. Pat. No. 5,629,790 by Neukermans et al. (Mar. 13, 1997), each of which is incorporated herein by reference.

The MEMS structure illustrated in FIG. 16(*a*) can be fabricated by using surface micro-machining such as MUMPS (Multi User MEMS Processing System) process, by bulk micro-machining such as the SOI (silicon-on-insulator) process, or by the LIGA process (x-ray lithography and electrodeposition). Such MEMS fabrication processes are described in detail in the literature. See, for example, Marc Madou, *Fundamentals of Microfabrication*, CRC Press, New York 1997, and Gregory T. A. Kovacs, *Micromachined Transducers—Source Book*, McGraw Hill, New York 1998. The MEMS structure can be made of a number of alternative materials including polysilicon, single crystal silicon, silicon carbide, diamond or metal.

On each movable disk 163, is disposed a single nanoscale electron field emitter 164 or a group of several emitters (if a somewhat broader electron beam is desired) The emitter is vertically oriented as a source of a vertically scanning e-beam. The field emitter 164 is preferably a carbon nanotube, but the use of other types of nanowires, sharp tips such as patterned silicon tips, or emitters of negative electron affinity material such as CVD diamond is not excluded. Carbon nanotubes grown on silicon pyramid tips may also be used. See U.S. Pat. No. 6,401,526 issued to Dai et al. on Jun. 11, 2002 which is incorporated herein by reference. To maintain high resolution with a minimal waste of space on the device surface, the nano emitter can be grown directly on the surface of the disk 163, for example, by utilizing nano-patterned nucleation (or catalyst) sites. Even a single nanotube is capable of providing a very large emission current density of as high as ~$10^8$ A/cm$^2$.

FIG. 16(*b*) illustrates an alternative display device 160B wherein the emitted beams are controlled by steering electrodes 168. Here the MEMs base 163 does not move. By subdividing the gate or focusing lens electrode, e.g., as independently controllable electrode segments (See FIG. 14) and applying asymmetric potentials among the electrode segments, each e-beam 167 can be made to project through an aperture 169 toward any selected direction. The electrons tend to move toward the electrode segment with higher applied voltage. The advantage in this approach is elimination of moving components and enhanced long-term reliability.

As a field emitter 164, the use of a single nanowire for each cell 161 is preferred to a multiplicity of nanowires for a very sharp, ultrahigh resolution display with a pixel resolution of less than ~100 nm. With a single nanowire the beam spread and perpendicular momentum is minimized. However, if a lesser ultrahigh resolution of ~1-5 micrometer is acceptable (as is sufficient for high resolution head-mountable or camera viewfinder displays), the e-beam size can be broader, and the nano emitter does not have to be a single nanoscale emitter. Several nanowires/nanotubes can be placed as a group preferably centered in each cell. If it is desired to improve the focusing of e-beams from multiple nanotube sources, secondary electrons may be utilized to lower the electron energy of the beam. For example the field emitted electrons can be reflected off a wall of material with a high secondary electron emission coeffecient (such as diamond).

The desired size of each MEMS cell can be determined based on the needs for high display resolution against the complexity of fabricating many small cells. The desired cell dimension is typically 200 micrometers or less, preferably less than 50 micrometers, and even more preferably less than 10 micrometers wide. The desired display pixel resolution is advantageously less than 10 micrometers, preferably less than 5 micrometers, even more preferably less than 2 micrometers.

The inventive, high resolution displays 160A, 160B can be useful for a number of applications such as a viewfinder of a camera or a head-mounted display as for a wearable computer. Such displays can be used for virtual reality traveling, remotely guided mechanical repair, or even surgery using telecommunication guidance.

D. Two Dimensional X-Ray Source

Figure 17:
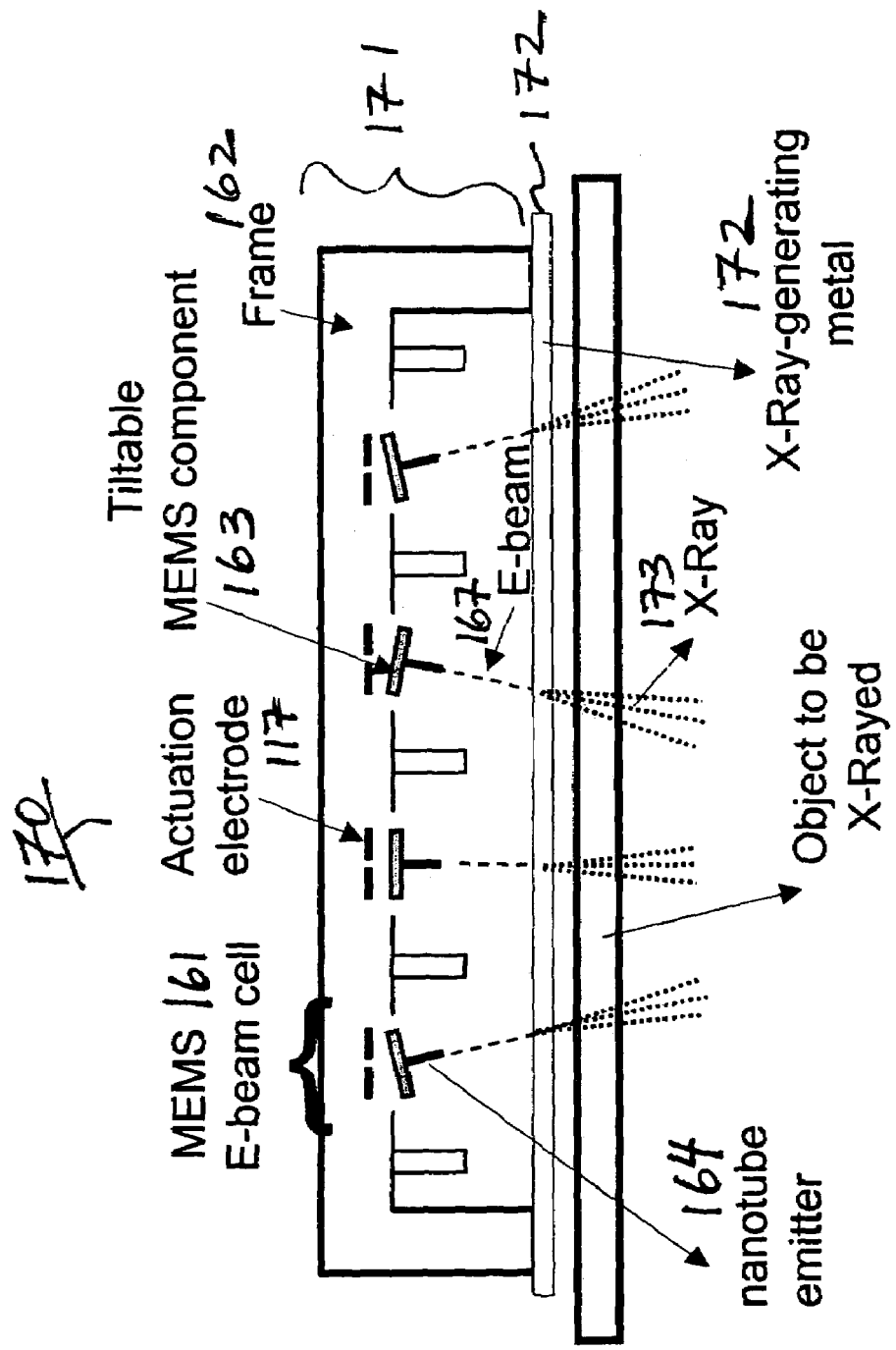
FIG. 17 shows a two-dimensional x-ray source in accordance with the invention.

The inventive two-dimensional e-beam source array comprising spaced-apart and centralized nanowire emitters can also be utilized as a high-resolution, programmable, two-dimensional x-ray source by incorporating x-ray generating metal film components in front of the emitted electrons. The source can be used for x-ray lithography or as a portable, flat-panel, x-ray source for on-site imaging, as by ambulance personnel or battle field medical personnel. Such an x-ray source can optionally incorporate MEMS-based e-beam steering capability. Such an embodiment is illustrated schematically in FIG. 17 (gates not shown). The x-ray source 170 comprises a flat panel MEMs E-beam source 171 directed toward an x-ray generating metal film 172 in front of the emitted electrons. The electron bombardment of the metal from each nanotube emitter 164 generates an x-ray beam 173 with characteristic wavelength.

It is understood that the above-described embodiments are illustrative of only a few of the many possible specific embodiments which can represent applications of the invention. Numerous and varied other arrangements can be made by those skilled in the art without departing from the spirit and scope of the invention.

What is claimed is:

1. An electron beam emitting source comprising:
    a gated field emission structure including an array of gated electron emission cells, each cell including an emitter support element, a gate electrode structure, a gate aperture and one or more nanowire electron emitters disposed on the support element and centrally positioned within the gate aperture, the total number of emitters in each cell limited to 10 or fewer, wherein each nanowire electron emitter is tapered from a thickest diameter portion to a sharp tip having a radius of curvature less than 1/10 of the thickest diameter.

2. An electron beam emitting source comprising:
a gated field emission structure including an array of gated electron emission cells, each cell including an emitter support element, a gate electrode structure, a gate aperture and one or more nanowire electron emitters disposed on the support element and centrally positioned within the gate aperture, the total number of emitters in each cell limited to 10 or fewer, wherein the gate electrode structure is patterned into an array of gates so that each gate can apply an electron-exacting voltage to a respective emission cell.

3. An electron beam emitting source comprising:
a gated field emission structure including an array of gated electron emission cells, each cell including an emitter support element, a gate electrode structure, a gate aperture and one or more nanowire electron emitters disposed on the support element, centrally positioned within the gate aperture and a directional control element to control the direction of an emitted beam, the total number of emitters in each cell limited to 10 or fewer.

4. The source of claim 3 wherein the emitter support element in each cell is movable and the directional control element comprises the movable emitter support element.

5. The source of claim 3 wherein each emitter is supported on a movably mounted MEMS disc and the directional control element controls the orientation of the MEMS disc.

6. The source of claim 3 wherein the directional control element comprises a plurality of electrodes adjacent the nanowire emitters for controlling the direction of emitted electrons.

7. A method of exposing selected portions of a surface to electrons comprising:
providing a plurality of gated emitter cells with centralized nanowire emitters, the total number of emitters in each cell limited to 10 or fewer;
inducing electron beams from the emitters; and
separately controlling the directions of the beams to direct the beams to the selected portions of the surface, wherein the beam directions are separately controlled by separately controlling the orientations of the nanowire emitters.

8. A method of exposing selected portions of a surface to electrons comprising:
providing a plurality of gated emitter cells with centralized nanowire emitters, the total number of emitters in each cell limited to 10 or fewer;
inducing electron beams from the emitters; and
separately controlling the directions of the beams to direct the beams to the selected portions of the surface, wherein the beam directions are separately controlled by separately deflecting the emitted beams.

9. A method of exposing selected portions of a surface to electrons comprising:
providing a source of electron beams including a plurality of gated emitter cells with centralized nanowire emitters, the total number of emitters in each cell limited to 10 or fewer;
disposing an electron beam mask between the source and the surface; and
inducing electron beams from the emitters toward the surface, wherein the surface includes a substrate supporting an electron beam resist.

10. An arrangement for performing electron beam lithography comprising:
a surface including an electron beam resist; and
a device for exposing selected portions of the surface to electrons, wherein the device includes a gated field emission structure including an array of gated electron emission cells, each cell including an emitter support element, a gate electrode structure, a gate aperture and one or more nanowire electron emitters disposed on the support element and centrally positioned within the gate aperture, the total number of emitters in each cell limited to 10 or fewer.

11. An arrangement for performing electron beam lithography comprising:
a surface including an electron beam resist; and
a device for exposing selected portions of the surface to electrons, wherein the device includes a gated field emission structure including an array of gated electron emission cells, each cell including an emitter support element, a gate electrode structure, a gate aperture and one nanowire electron emitter disposed on the support element and centrally positioned within the gate aperture.

12. An arrangement for performing electron beam lithography comprising:
a surface including an electron beam resist; and
a device for exposing selected portions of the surface to electrons, wherein the device includes a gated field emission structure including an array of gated electron emission cells, each cell including an emitter support element, a gate electrode structure, a gate aperture and one or more nanowire electron emitters disposed on the support element, centrally positioned within the gate aperture and a directional control element to control the direction of an emitted beam, the total number of emitters in each cell limited to 10 or fewer.

13. A visual display apparatus comprising:
a surface including a phosphor for generating light in response to electrons; and
a device for exposing selected portions of the surface to electrons, wherein the device includes a gated field emission structure including an array of gated electron emission cells, each cell including an emitter support element, a gate electrode structure, a gate aperture and one nanowire electron emitter disposed on the support element and centrally positioned within the gate aperture.

14. In an improved microwave amplifier comprising a cathode electron emitter, a grid, an anode, a tail pipe and a collector,
the improvement wherein the cathode electron emitter includes an electron beam emitting source, wherein the electron beam emitting source includes a gated field emission structure including an array of gated electron emission cells, each cell including an emitter support element, a gate electrode structure, a gate aperture and one nanowire electron emitter disposed on the support element and centrally positioned within the gate aperture.

* * * * *